United States Patent
Higashiya et al.

[11] Patent Number: 5,724,211
[45] Date of Patent: Mar. 3, 1998

[54] MAGNETIC HEAD SUPPORT MECHANISM, HAVING BEAM PORTION CURVED WITH INTERNAL STRESS

[75] Inventors: Teruyoshi Higashiya, Odawara; Mikio Tokuyama, Tsukuba; Satomitsu Imai, Odawara; Takeshi Harada, Abiko; Yoshinori Takeuchi, Ishioka, all of Japan

[73] Assignee: Hitachi, Ltd., Tokyo, Japan

[21] Appl. No.: 665,932

[22] Filed: Jun. 19, 1996

[30] Foreign Application Priority Data

Jun. 27, 1995 [JP] Japan ................. 7-161270

[51] Int. Cl.⁶ .................................. G11B 5/48
[52] U.S. Cl. .................................. 360/104
[58] Field of Search ........................ 360/103, 104

[56] References Cited

U.S. PATENT DOCUMENTS 5,539,596 7/1996 Fontana ................. 360/104

FOREIGN PATENT DOCUMENTS

| 3-178017A | 8/1991 | Japan . |
| 4-345978A | 12/1992 | Japan . |
| 5-135525A | 6/1993 | Japan . |
| 7-057418 | 3/1995 | Japan . |

Primary Examiner—A. J. Heinz
Attorney, Agent, or Firm—Kenyon & Kenyon

[57] ABSTRACT

A magnetic head support mechanism comprises a beam portion and a mount for connection to an actuator, which are integrally formed of a ceramic material. The beam portion has a magnetic head supported on a free end side thereof, which magnetic head comprises a magnetic head element and a magnetic head slider. The beam portion has at a part thereof a curved portion which is formed by spontaneous deformation due to internal stress. The integrated magnetic head support mechanism thus provided can be easily handled similarly to a conventional stainless-steel magnetic head support mechanism.

20 Claims, 12 Drawing Sheets

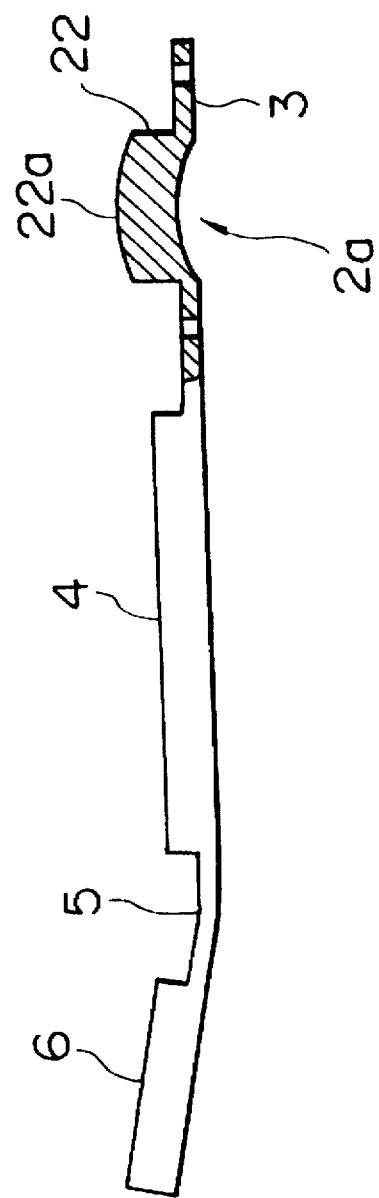
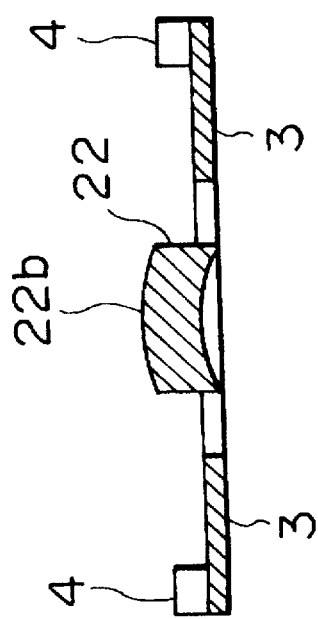
FIG. 12A
FIG. 12B

MAGNETIC HEAD SUPPORT MECHANISM, HAVING BEAM PORTION CURVED WITH INTERNAL STRESS

BACKGROUND OF THE INVENTION

The present invention relates to a magnetic head support mechanism in a magnetic disk apparatus and a method of manufacturing the same and, more particularly, to a technique which is effective for application to a case wherein a ceramics material, a monocrystalline silicon material, or a silicon-on-insulator or SOI material is used as a major material of a magnetic head support mechanism in a hard disk apparatus.

In a hard magnetic disk apparatus, as a measure for improving the traceability of a magnetic head slider to a rotating magnetic disk or improving the stability of high-speed seeking, the size and weight of the magnetic head slider have been decreased.

However, conventionally, a magnetic head slider on which a magnetic head is mounted and a head support mechanism of stainless-steel are manufactured in separate processes, respectively, and are connected to each other. For this reason, a demand for decreasing the magnetic head slider in size and weight inevitably causes difficulty in assembling the magnetic head slider. When a very small magnetic head slider is mounted on a magnetic head support mechanism, since the very small magnetic head slider cannot be easily handled, the possibility of an assembly error increases, thereby leading to variations in floating performance and the like of the magnetic head slider. This will pose more serious problems in the future as magnetic disk apparatuses are more reduced in size.

A counter-measure for this has been proposed in, for example, Japanese Unexamined Patent Publication Nos. 3-178017, 5-135525, and 4-345978. That is, a magnetic head slider and a magnetic head support mechanism are integrated into one united body by aluminum oxide or the like to decrease them in size and weight.

Japanese Unexamined Patent Publication No. 3-178017 discloses a technique in which aluminum oxide is used as the material of a magnetic head support mechanism and a magnetic head is integrally provided thereon to reduce the size and weight. In this case, the magnetic head support mechanism is formed in a long and narrow beam, and it is adapted to deflect as a flexible body to generate a pressing pressure for a magnetic disk.

Japanese Unexamined Patent Publication No. 5-135525 discloses a technique in which a magnetic head support mechanism as disclosed in Japanese Unexamined Patent Publication No. 3-178017 is attached to a rigid arm which is fixed to an actuator and spaced from a magnetic disk surface, and another part having a bent angle is interposed between them to decrease the inter-surface distance of the disk.

Japanese Unexamined Patent Publication No. 4-345978 has proposed that a magnetic head support mechanism is further combined with a magnetic head positioning apparatus which has a rigid arm with a rotating mechanism exclusive for the magnetic head support mechanism, to decrease the magnetic head in size and weight and to improve the reliability. This publication notices a problem in that the floating properties of the magnetic head slider may be deteriorated depending on how head signal lines are routed for outputting a signal from the magnetic head, and discloses a wire-integration type magnetic head support mechanism in which the signal lines are patterned on the magnetic head support mechanism as a counter-measure.

However, in the magnetic head support mechanism disclosed in Japanese Unexamined Patent Publication No. 3-178017, the beam for generating a pressing force has no bent or curved portion. Accordingly, in order to mount the magnetic head support mechanism on a magnetic disk apparatus, it is necessary to take such a method as described in Japanese Unexamined Patent Publication No. 5-135525, in which a separate part with a bent angle is provided and the mechanism is attached to a rigid arm with the aid of this part, or another method in which a surface of the rigid arm for attachment of the magnetic head support mechanism is tapered to provide a predetermined inclination angle between the magnetic head support mechanism and the rigid arm. This leads to an increase in the number of manufacturing steps and component parts, thereby increasing the production cost. Further, the complicated process involves deterioration of the precision of parts and causes the reliability of products to be degraded.

According to the technique of Japanese Unexamined Patent Publication No. 4-345978, it is required to newly develop the rigid arm with the rotating mechanism. Therefore, there are many difficulties in manufacturing a magnetic head of high performance and its support mechanism at a low cost by effectively using the existing technique and equipment.

Moreover, according to the conventional arts described above, the magnetic head support mechanism is attached at a predetermined angle with respect to a plane parallel to the magnetic disk surface. When the magnetic head of the magnetic head support mechanism is pressed against the magnetic disk surface, the head support mechanism deflects as a whole to deviate from the plane parallel to the magnetic disk surface. This corresponds to deflection of the entirety of the integrated magnetic head shown in FIG. 20 of Japanese Unexamined Patent Publication No. 5-135525. As a result, there is a problem in that the in-plane rigidity or in-plane characteristic frequency in the plane parallel to the magnetic disk decreases and the stability in a seeking operation is degraded.

SUMMARY OF THE INVENTION

It is an object of the present invention to provide a magnetic head support mechanism which can be handled in the same manner as a conventional stainless-steel magnetic head support mechanism without structural modification of effecting a special processing for generation of a pressing load on the rigid arm of an existing magnetic disk apparatus or without addition of a new part having a curving angle.

Another object of the invention is to provide a magnetic head support mechanism which can satisfy both the demand for decrease in size and weight and the demand for removing the difficulty in handling during assembly.

Still another object of the invention is to provide a magnetic head support mechanism which can prevent the reliability of a magnetic disk apparatus from deteriorating due to the contact of a magnetic head with a magnetic disk during suspension of operation of the magnetic disk apparatus.

Still another object of the invention is to provide a magnetic head support mechanism made of ceramics material, monocrystalline silicon material, or SOI material, which requires no development of a new magnetic head support mechanism and a positioning mechanism therefor and can be handled with ease similarly to a conventional stainless-steel magnetic head support mechanism.

It is still another object of the invention to provide a method capable of manufacturing a large number of magnetic head support mechanisms, each of which realizes a small size and a light weight and can be handled similarly to a conventional stainless-steel magnetic head support mechanism, with good precision so as to make quality control easy.

It is still another object of the invention to provide a method capable of manufacturing a magnetic head support mechanism while precisely controlling its bent angle, which mechanism can be handled similarly to a conventional stainless-steel support mechanism and realizes a small size and a light weight.

Still another object of the invention to provide a method of manufacturing a magnetic head support mechanism of ceramics material, monocrystalline silicon material, or SOI material, which requires no development of a new magnetic head support mechanism and a positioning mechanism therefor and can be easily handled similarly to a conventional stainless-steel magnetic head support mechanism.

Still another object of the invention is to provide a magnetic disk apparatus in which the magnetic head support mechanism referred to above, when built therein, can cause a load for pressing a magnetic head to a magnetic disk surface to be generated without any particular structural modification or addition of particular parts for generating the pressing load.

It is still another object of the invention to provide a magnetic disk apparatus in which the magnetic head support mechanism referred to above, when built therein, does not deviate from a plane parallel to a magnetic disk surface and is excellent in stability during a seeking operation.

In order to achieve the above objects, the invention aims at providing a curved portion in a part of a magnetic head support mechanism. The curved portion is formed by spontaneous deformation due to internal stress by using a difference between internal stress of a substrate and that of a thin film formed on a part of the substrate surface. This deformation, in the case where the thin film has been formed before the magnetic head support mechanism is cut from the substrate, occurs when the internal stress is generated at the time of cutting, and thus, the curved portion is formed.

More specifically, the thin film formed on the substrate, when it is different in material from the substrate, or when the temperature at which the thin film is formed is higher or lower than the normal temperature, generates internal stress due to a difference between aggregation of the substrate material and that of the thin film material or a difference between thermal expansion coefficients of their materials. The thin film having internal stress is formed on both side surfaces of the substrate, and then the thin film on one side surface of a substrate portion which is desired to be the curved portion is removed by etching. The curve can be thus formed by the internal stress generated in the thin film remaining on the opposite surface of the portion from where the thin film has been removed. The thin film may be formed on only one surface of the substrate and then removed, except a portion which is desired to be the curved portion, from the remaining area. With such formation of the film, there is substantially no stress in the area where the thin film has been removed, and the stress exists in the area where the thin film is left. The curved portion can be formed in the area in which the thin film is left. In this case, the substrate has to be substantially flat.

Alternatively, a substrate which is curved originally may be used. The thin film is formed on one surface of the curved substrate to make the substrate substantially flat. Then, the thin film in an area in which the curved portion is to be formed is removed, so that the curved portion can be formed by the substrate portion where no thin film exists.

Typically, the region or area in which the curve is formed can be a beam portion of a magnetic head support mechanism. In this case, the magnetic head support mechanism comprises a mount, which is fixed to a rigid arm supported by an actuator, and the beam portion. One end of the beam portion is stationary or fixed and connected to the mount. The other end is free, and a magnetic head is carried on this free end. The magnetic head comprises a magnetic head element alone or a magnetic head slider and a magnetic head element supported by the slider. The former means the case where a very small head is integrally formed in the free-end region of the beam portion. When the magnetic head comprises the magnetic head slider and the magnetic head element, the free-end region of the beam portion includes a gimbal in which the magnetic head slider is held.

The substrate described above may be of an organic material or an inorganic material insofar as it is hard to some extent and has flexibility. However, in consideration of thermal stability, chemical stability, and facility of a manufacturing process design, the substrate is preferably made of a ceramics material, a monocrystalline silicon material, or a SOI material. The thickness of the substrate is typically set to be 10 μm to 100 μm, more preferably, 20 μm to 35 μm.

The material of the thin film is not limited to a specific one insofar as it can be formed on the substrate to generate stress. However, when a ceramics material, a monocrystalline silicon material, or a SOI material is used for the substrate, it is preferable to use an inorganic material such as silicon nitride, silicon oxide, alumina, titanium nitride, titanium oxide, PSG (Phospho Silicate Glass), BPSG (Boro Phospho Silicate Glass), spin-on glass or the like, or a metal such as aluminum, gold, platinum, a gold alloy, a platinum alloy, chromium, tungsten, titanium, molybdenum or the like. These materials for the thin film have been selected because of mechanical strength sufficient to generate stress and further from the viewpoint of chemical stability, a wide selection range of substrate temperature which is effective to control the stress to be generated, or the possibility of forming the film in a wide temperature range, and like factors. In particular, the use of a silicon compound as the material of the thin film for generating internal stress according to the invention, which is represented by silicon nitride or silicon oxide, since such material is well known in the field of semiconductor devices, is advantageous in that a manufacturing apparatus can be easily obtained and the existing manufacturing processes can be utilized.

As for a typical method of manufacturing the above thin film, a plasma sputtering method, a CVD method, a vacuum deposition method, a reactive sputtering method, a glass reflow method, a spin method, a dip method, or the like may be used. Although the thickness of the thin film depends on the thickness of the substrate, internal stress in the thin film and a design bent angle, the thickness is set to be 0.1 μm to 2 μm, preferably, 0.3 μm to 1 μm.

As a method of selectively removing the thin film, a photolithography technique can be used. Although this method has conventionally been used in a silicon wafer process represented by LSI manufacturing, as will be described later, the method has a unique effect when manufacturing the magnetic head support mechanism according to the invention.

The above description has been made on the method of forming the thin film on the entire surface of the substrate and then selectively removing the thin film to form the curved portion. However, the invention includes a method of selectively forming a thin film on a flat substrate to generate stress in a region in which the thin film is present so as to form a curved portion.

In this case, as a method of selectively forming a thin film, it is possible to take a method of using a metal mask and forming the thin film through an opening of the metal mask, or a method of forming a mask such as a resist film, forming the thin film on the entire surface of a substrate including the resist film and then peeling off the resist film.

Further, as a processing method of forming the curved portion by spontaneous deformation due to internal stress, in addition to the above method of forming and removing the thin film, another method of chemically reforming or physically processing the front or rear surface of a substrate to form the curved portion can be used.

The method of chemically reforming the substrate surface is carried out as follows. An energy beam, such as an ion beam, an electron beam, a high-output laser beam, or focused infrared rays, is irradiated to a specific region of the substrate in which the curved portion is to be formed, to locally melt a portion near the surface of the specific region, and the irradiation is stopped to rapidly cool the portion, thereby generating a difference between internal stress of the irradiated surface and internal stress near the surface opposite to the irradiated surface.

Further, the following method is also effective. That is, while irradiating an energy beam having chemical excitation ability, such as an ion beam, an electron beam, a laser beam, or ultraviolet rays, to the specific region, a gas is supplied thereto to activate the region, thereby reforming the region by chemical reaction. For example, when the substrate is of an oxide such as a silicon oxide or alumina, the above energy beam is irradiated while spraying a hydrogen gas or the like which has a strong reduction effect in an activation state. As a result, the irradiated surface is reduced to have a small amount of oxygen and thereby causes a difference in internal stress from the surface opposite to the irradiated surface.

The surface of the specific region may be reformed with the other region masked with a resist film or the like.

As a physical processing method, a method of grinding a specific region to a predetermined depth, in which a curved portion is desired to be formed, can be taken. As for the grinding, in addition to precise machining, a method of masking the substrate surface other than the specific region with a resist film or the like and then etching by plasma sputtering or the like, a method of removing by ion milling, a method of performing abrasion by a laser beam, or the like can be employed.

In the above physical processing, internal stress is desirably distributed in the direction of the thickness of the substrate, but even when no such distribution occurs, a curved portion is naturally formed by surface tension and aggregation of the material. Accordingly, the internal stress distribution in the thickness direction is not a necessary condition. The physical processing and the chemical processing can be combined as a matter of course.

The process of causing spontaneous deformation by internal stress may be performed before an element serving as the magnetic head support mechanism is cut from the substrate or after the element has been cut therefrom. That is, the process for generating internal stress may be before or after cutting of the substrate.

Further, the magnetic head support mechanism of the invention has a magnetic head integrally formed in the free-end region of a beam portion having the above curved portion. In this case, the magnetic head includes a magnetic head element for converting an input current signal into a magnetic field, and a magnetic head slider. The magnetic head slider has a function of producing a floating force for holding the magnetic head at a predetermined distance from the magnetic disk. As for a magnetic head such as a very small head or the like which is used in contact with a magnetic disk, the magnetic head does not include a magnetic head slider, but fine projections. In this case, the fine projections have a function of decreasing the friction coefficient between the magnetic head and the magnetic disk. The magnetic head may include both the magnetic head slider and the fine projections as a matter of course. Alternatively, only the magnetic head slider or fine projections may be integrally formed, and then the magnetic head element may be attached.

There is a case where a magnetic head and a support mechanism therefor are separately formed and then connected to each other into one part. Rather, most magnetic head support mechanisms have conventionally been manufactured by this procedure. However, the magnetic head support mechanism of the invention described above features forming and selectively removing a thin film and is also characterized by the use of photolithography as a method of realizing this. Accordingly, a beam portion and a mount, which are main parts of the magnetic head support mechanism of the invention, can be manufactured by photolithograpy, and then a magnetic head portion can be integrally formed.

That is, the magnetic head portion can also be manufactured by photolithography similarly to the magnetic head support mechanism of the invention. The use of photolithography is rather convenient because the process can be simplified and the manufacturing accuracy and the reliability or yield can be improved.

The material of the magnetic head slider or fine projections is preferably a ceramic material, a monocrystalline silicon material, or an SOI material which is the material of the substrate of the magnetic head support mechanism. It is also possible to use material such as silicon nitride, silicon oxide, alumina, titanium nitride, titanium oxide, PSG (Phospho Silicate Glass), BPSG (Boro Phospho Silicate Glass), or spin-on glass, which is the material of the thin film for generating internal stress. When a material of the same sort as with the thin film is used, no introduction of a new equipment and no development of a new process are required which is an advantage.

As for the method of forming the magnetic head slider or fine projections, a plasma sputtering method, a CVD method, a vacuum deposition method, a reactive sputtering method, a glass reflow method, a spin method, a dip method, or the like, can be used. Processing for a predetermined shape may be etching using photolithography, either dry etching or wet etching, or ion milling.

The magnetic head element integrated with the magnetic head slider or the magnetic head element which is directly provided in the free-end region of the beam portion can be formed such that the above steps of forming a thin film and etching are combined with each other, and a ferromagnetic material, a paramagnetic material, a conductive material, or the like, is processed and connected into a predetermined shape.

In the magnetic disk apparatus of the invention, when the magnetic head support mechanism having the curved portion describe above is mounted on the apparatus, the magnetic head which is supported in the free-end region of the beam portion of the magnetic head support mechanism is pressed against the magnetic disk surface to generate a pressing pressure. At the same time, the curved portion formed in the magnetic head support mechanism is bent in the opposite direction to its curve. In this manner, the magnetic head support mechanism is arranged substantially parallel to the magnetic disk surface as a whole.

In this case, it is preferable that the entire surface of the magnetic head support mechanism, i.e., all the surface of the beam portion on which the magnetic head is supported and the surface of the mount fixed to the rigid arm are parallel to the magnetic disk surface. But, all the portions referred to above need not be parallel to the magnetic disk surface. This is because, considering the object of the invention, it is required not to decrease the characteristic frequency of the magnetic head support mechanism. To this end, it is important that the beam portion on which the characteristic frequency may be mainly dependent is designed to be parallel to the magnetic disk surface. However, since the magnetic head support mechanism of the invention can be manufactured with high precision, when the same is mounted on a rigid arm which has originally been designed to be parallel to the magnetic disk, the magnetic head support mechanism becomes parallel to the magnetic disk within a precision range. This range is ±1°, preferably, ±3°, with respect to a plane parallel to the magnetic disk.

As described above, the magnetic head support mechanism of the invention has the curved portion before it is mounted on the magnetic disk apparatus. The angle between the beam portion except for the curved portion and the mount is typically set to be 3° to 10°, more preferably, 4° to 7°.

In the magnetic head support mechanism in which the magnetic head slider is integrated with the beam portion, by simultaneously forming the thin film for causing the curved portion on the rear surface of the integrated magnetic head slider, a crown or a camber can be formed.

According to the above measure, even a small, compact magnetic head support mechanism using the substrate of a ceramic material, a monocrystalline silicon material, or a SOI material, when being mounted on the magnetic disk apparatus, can easily be handled in a similar manner to the magnetic disk apparatus where a conventional stain-less steel magnetic head support mechanism is mounted, because the curved portion has been formed near its portion for attachment to the rigid arm arranged in a carriage of the magnetic head support mechanism.

Further, according to the invention, the magnetic head support mechanism has been provided with the curved portion and, therefore, a pressure for pressing the magnetic head portion to the magnetic disk can be obtained only by mounting the support mechanism in parallel with the rigid arm. Accordingly, to this end, neither an additional part nor a cumbersome step of forming a bend near the attaching portion is required. This enables the manually cumbersome step of bending to be removed from the assembling of the magnetic head support mechanism. Thus, the manufacturing is simplified, and the production cost can be reduced. This is the technique which can meet with a demand for reducing a magnetic disk apparatus in size, which demand will increase more and more in the future.

Furthermore, in the invention, the magnetic head support mechanism and the magnetic head are integrated with each other, manufacturing precision can be kept high, and parts having high reliability can be provided. In addition, when the integrated magnetic head support mechanism of the invention is manufactured by the magnetic head support mechanism manufacturing method which is another aspect of the invention, a more remarkable effect can be obtained. More specifically, since the magnetic head can be formed by the same method as the forming of a curved portion by the combination of thin film formation and photolithography, which is the feature of the invention, the manufacturing apparatus can be used commonly, and the process technique can be shared, so that a rational manufacturing line can be designed and operated. The continuous production of the magnetic head support mechanism and the magnetic head can achieve not only a reduction in the cost of parts, but also improvement on product reliability and an increase in yield.

In the magnetic head support mechanism and the manufacturing method according to the invention, as the material of the substrate of the magnetic head support mechanism, a monocrystalline silicon substrate, a ceramic substrate, such as an $Al_2O_3$—Tic substrate or an $Al_2O_3$ substrate, or a SOI substrate using $Al_2O_3$, $SiO_2$ or the like as an insulating material, can be used. This is because that such material has excellent adhesion affinity for a $Si_3N_4$ or $SiO_2$ film which is formed on the surface of the mechanism, and is excellent in thermal and chemical stability and selectivity of an etchant which are required both in the thin film forming and the etching employed in the manufacturing method.

Moreover, in the magnetic disk apparatus of the invention, when the magnetic head and the support mechanism therefor described above are mounted, the magnetic head portion is pressed against the magnetic disk so that the curved portion becomes substantially flat to be in parallel with the magnetic disk surface. Accordingly, the stability in a seeking operation can be assured without decreasing the characteristic frequency vibration of the magnetic head support mechanism during operation of the apparatus.

BRIEF DESCRIPTION OF THE DRAWINGS

FIGS. 5A to 5G are explanatory views showing in sequence the steps of a magnetic head support mechanism manufacturing method according to the invention, wherein FIGS. 5B to 5G are sectional side views taken along line A—A' of FIG. 5A;

FIGS. 6A to 6F are explanatory views showing in sequence the steps of another magnetic head support mechanism manufacturing method according to the invention, wherein FIGS. 6B to 6F are sectional side views taken along A—A' line of FIG. 6A;

FIG. 12A is a partially sectional view taken along line XIIA—XIIA line of FIG. 8, showing the shapes of a crown and a camber in the magnetic head support mechanism of the invention, and FIG. 12B is a sectional view taken along line XIIB—XIIB line of FIG. 8.

DETAILELD DESCRIPTION

Embodiments of the invention will be described below with reference to the accompanying drawings.

(Embodiment 1)

Figure 1:
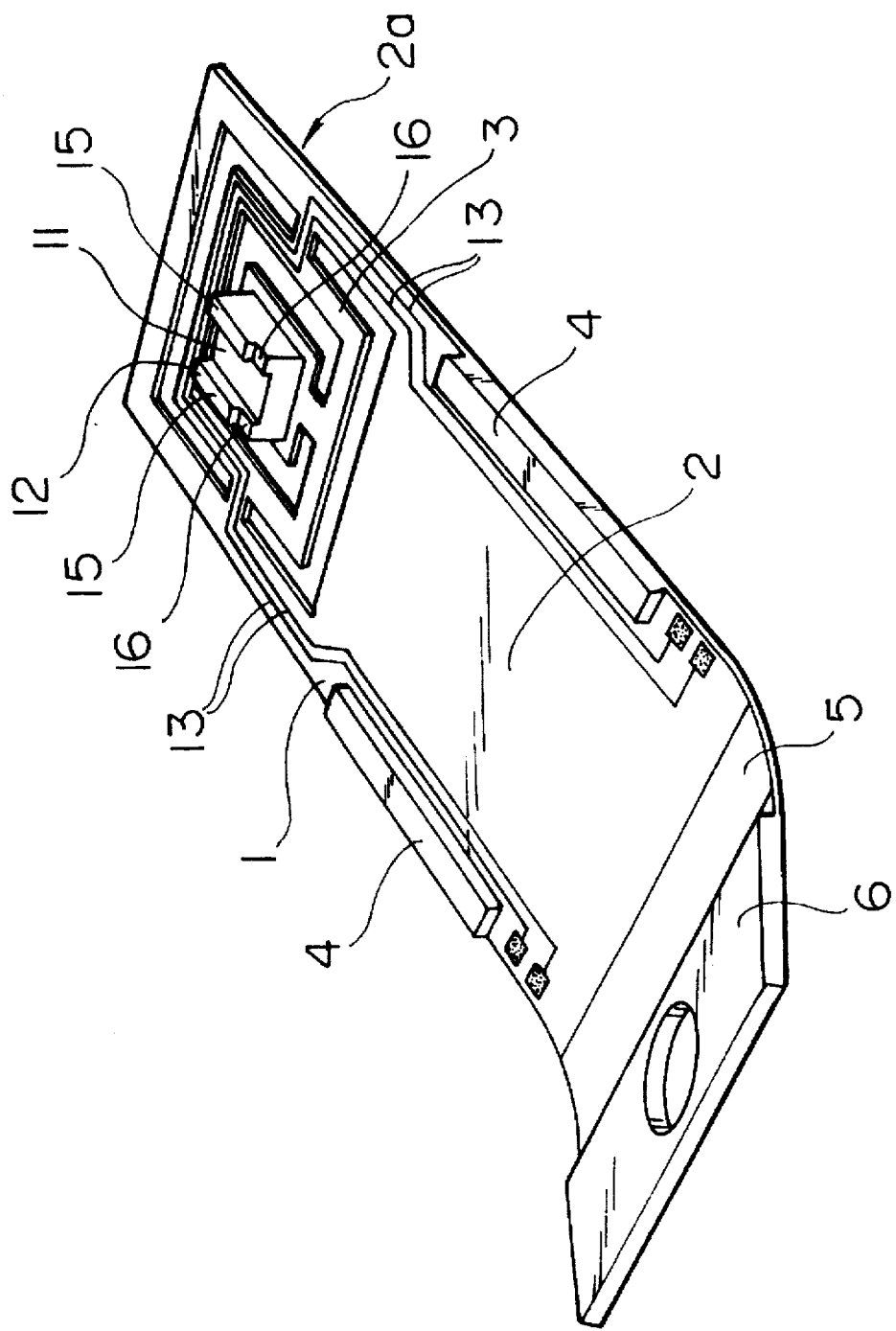
FIG. 1 is a perspective view showing a magnetic head support mechanism according to an embodiment of the invention.

FIG. 1 is a perspective view schematically showing the magnetic head support mechanism according to this embodiment.

The magnetic head support mechanism 1 according to the embodiment includes a beam portion 2, a gimbal 3 which is included in the beam portion 2 and located in a free-end region 2a thereof, flanges 4 for ensuring the mechanical strength of the beam portion 2, a curved portion 5, and a mount 6 serving as a fixed end. The curved portion 5 is included in the beam portion 2 and connected to the mount 6. A magnetic head slider 11 is supported on the gimbal 3. The magnetic head slider 11 has a magnetic head element 12, floating force generation surfaces 15, and flow-in ends 16, and wires 13 are arranged on the surface of the beam portion 2.

In this embodiment, the magnetic head slider 11 and the magnetic head support mechanism 1 for supporting the magnetic head are separately manufactured, and the magnetic head slider 11 on which the magnetic head element 12 is supported is assembled such that it is fixed by adhesion to the gimbal 3 formed on the free-end region 2a of the beam portion 2. Terminals (not shown) for outputting a signal are formed on an opposite surface to a magnetic disk of the magnetic head slider 11, i.e., on the rear side of the surface on which the floating force generation surface 15 are formed, so that the magnetic head element 12 can be electrically connected to the wires 13 for a read-write signal formed on the beam portion 2.

Figure 2:
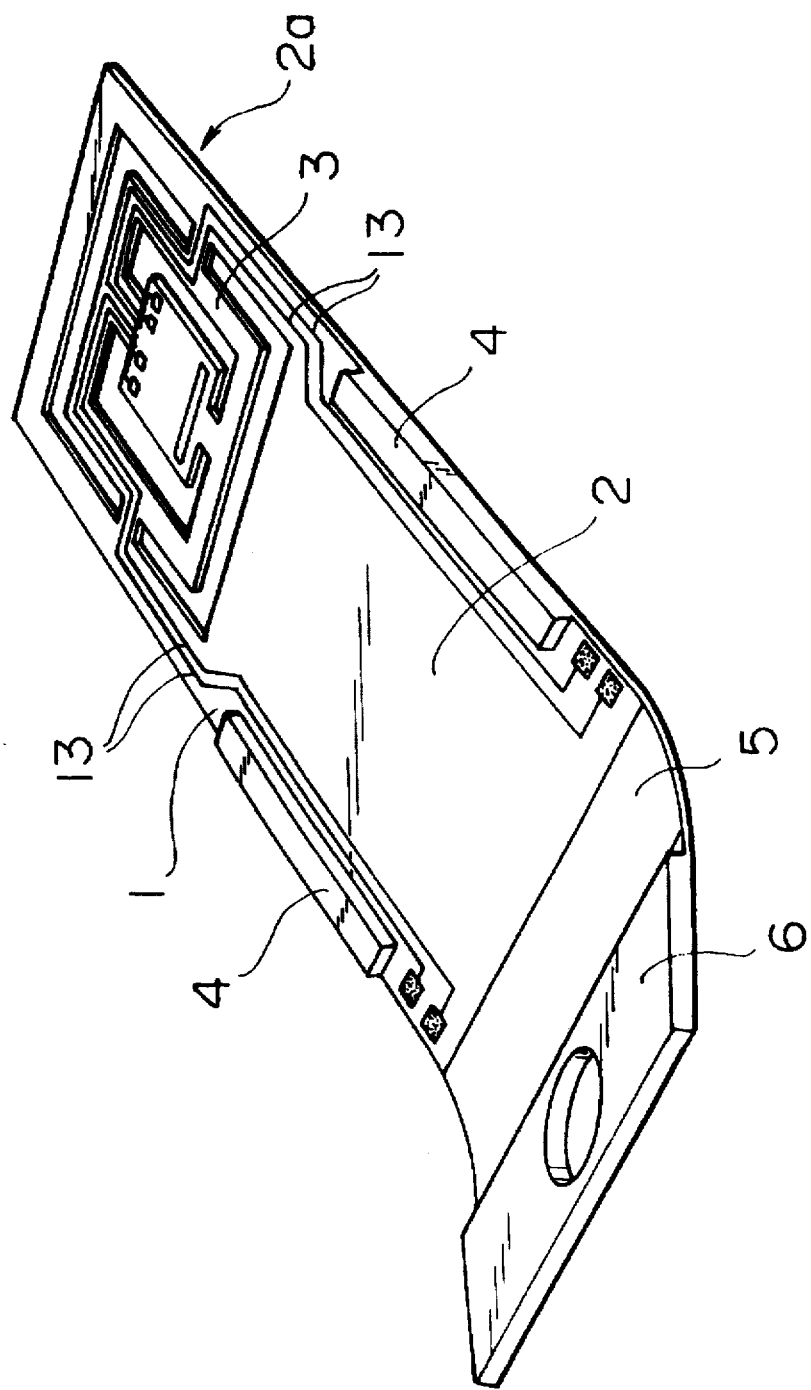
FIG. 2 is a perspective view of the magnetic head support mechanism of FIG. 1, in which a head slider has been removed.

FIG. 2 is a perspective view of the magnetic head support mechanism 1 according to the embodiment in which the magnetic head slider 11 is not adhered. The magnetic head magnetic head support mechanism 1 is made of monocrystalline silicon having an Si$_3$N$_4$ film formed on its surface. In the magnetic head support mechanism 1, the curved portion 5 is formed in the beam portion 2 near the mount 6, which serves as a portion for attachment to a rigid arm arranged on a carriage, to provide an initial bent angle of the beam portion 2 with respect to the mount 6. This curved portion 5 is formed in the following manner. An Si$_3$N$_4$ film is deposited on the surface of a part of the beam portion 2 of the magnetic head support mechanism 1 to generate internal stress in this part of the beam portion 2.

The magnetic head support mechanism 1 of the embodiment is formed to have the initial bent angle of 5°. To this end, an Si$_3$N$_4$ film having a thickness of 0.47 μm is formed on the monocrystalline silicon substrate which has a thickness of 25 μm. As for the dimensions of the curved portion 5, the length is 2.4 mm, and the width is 4 mm.

The magnetic head support mechanism 1 of the embodiment has small dimensions as a whole, i.e., a width of 4 mm and a length of 10 mm. Since the curved portion 5 is formed in advance, a bending jig which has conventionally been required is not necessary, and assembling for achieving a predetermined dimensional precision can be easily performed.

According to the magnetic head support mechanism 1 of this embodiment, in a magnetic head support mechanism of ceramic, monocrystalline silicon, or an SOI material, the curved portion 5 is integrally formed on the beam portion 2 near the mount 6 serving as an attaching portion of the magnetic head support mechanism 1. Accordingly, when the magnetic head support mechanism 1 is mounted on a magnetic disk apparatus, the precise and fine magnetic head support mechanism 1 can be handled in a similar manner to a conventional stainless-steel support mechanism, and the assembling process can be made simple. In addition, neither new part such as attaching jig having a bent angle nor cumbersome process of forming a bend near the attaching portion is required.

Figure 3:
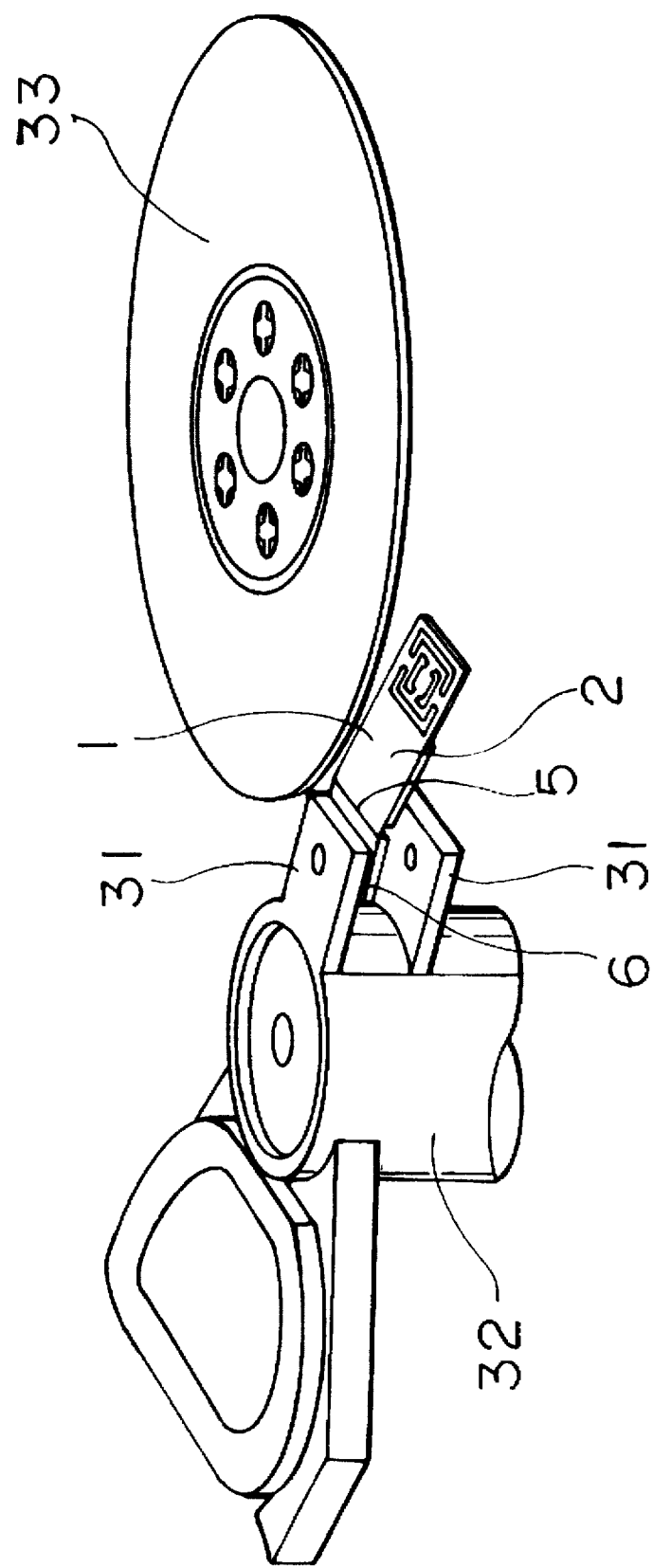
FIG. 3 is a perspective view showing a positioning device on which the magnetic head support mechanism of FIG. 1 is mounted.

FIG. 3 is a schematic view showing a positioning device on which the magnetic head support mechanism 1 having the curved portion 5 in the beam portion 2 shown in Embodiment 1 is mounted.

The magnetic head support mechanism 1 is supported at its mount 6 by the rigid arm 31 that is fixed to an actuator 32. The mount 6 serving as an attaching portion to the rigid arm 31 is in a plane parallel to the surface of the magnetic disk 33. The magnetic head support mechanism 1, in a state before the magnetic head support mechanism 1 is incorporated in the magnetic disk apparatus, i.e., a state wherein no external force acts on the magnetic head, is bent at the curved portion 5 of the beam portion 2. Therefore, the free-end region 2a of the beam portion 2, to which the slider 11 is attached, crosses the magnetic disk 33, which is in a plane parallel to the mount 6 serving as an attaching portion to the rigid arm 31, at an angle corresponding to the bent angle.

Although only one magnetic head support mechanism 1 is illustrated in this figure for simplification, a plurality of magnetic head support mechanisms may, of course, be mounted.

Figure 4:
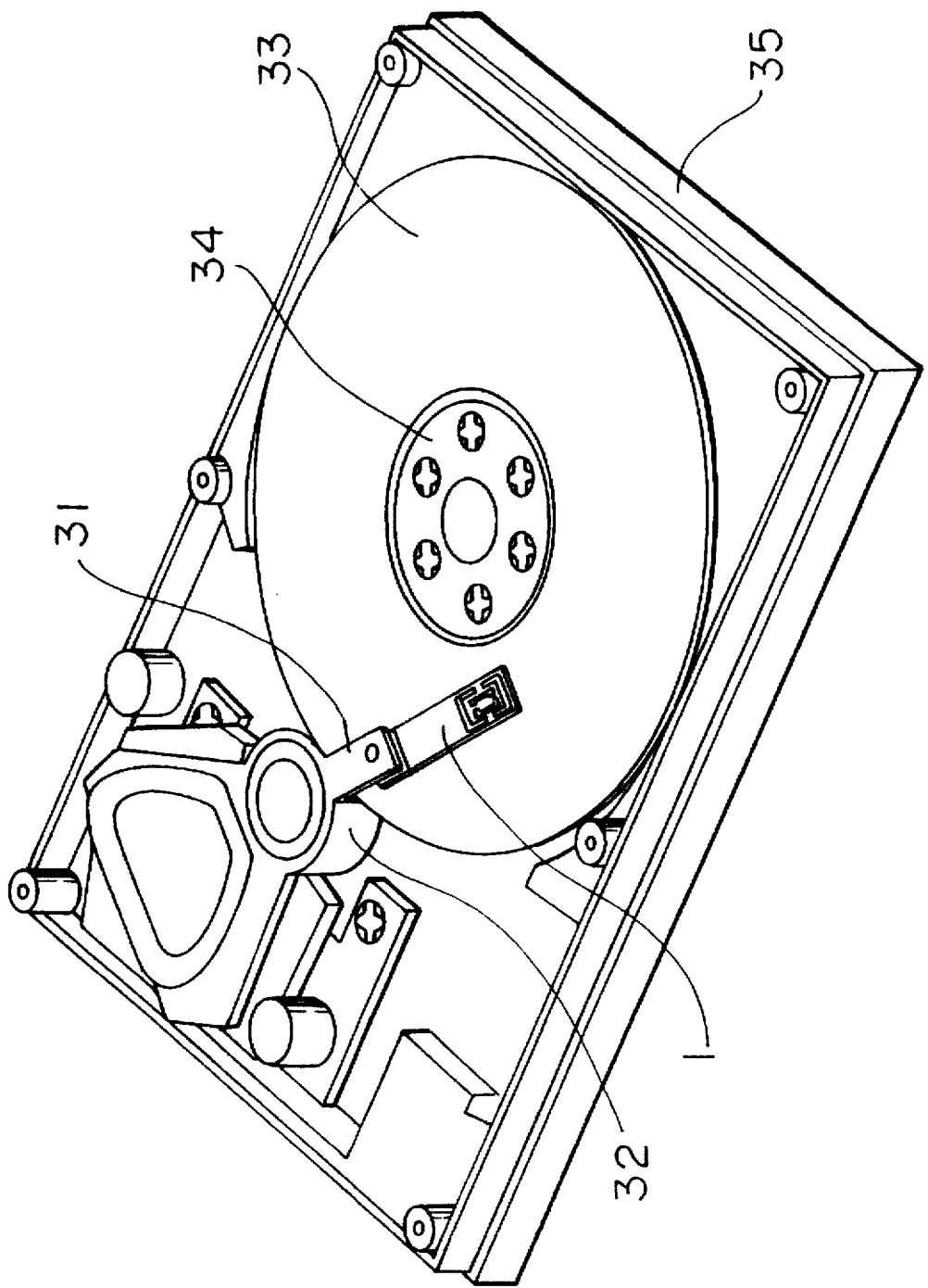
FIG. 4 is a view showing a magnetic disk apparatus on which the magnetic head support mechanism of FIG. 1 is mounted.

FIG. 4 is a schematic view showing a case wherein the positioning apparatus shown in FIG. 3, on which the magnetic head support mechanism 1 of Embodiment 1 having the curved portion 5 formed in the beam portion 2 is mounted, is applied to a magnetic disk apparatus.

The magnetic disk apparatus is depicted with an upper cover removed to show the interior. When the magnetic head support mechanism 1 is mounted on the magnetic disk apparatus, the magnetic head supported in the free-end region 2a of the beam portion 2 of the magnetic head support mechanism 1 has reaction from the magnetic disk 33, and the curved portion 5 is bent in a direction opposite to the direction of its initial bending or curving. In other words, to the magnetic head comprising the magnetic head slider 11 and the magnetic head element 12, a pressing load is exerted due to a resilient force caused by decreasing the bent angle of the curved portion 5 and a reaction force from the upper surface of the magnetic disk 33. In this manner, in the magnetic disk apparatus of this embodiment, the magnetic head support mechanism 1 mounted thereon need not have a bend in advance, and no additional part having a bent portion is required. This avoids a cumbersome step in assembling of the magnetic disk apparatus. Accordingly, a factor of deteriorating the reliability of the magnetic disk apparatus caused by the cumbersome step can be removed.

As a result, the reliability of the magnetic disk apparatus can be improved. In addition, since the cumbersome process is simplified, the manufacturing cost of the magnetic disk apparatus can be suppressed low.

Deflection caused by pressing the free-end region 2a of the beam portion 2 almost comes to a result that the bending of the curved portion 5 becomes close to a flat state. That is, substantially no deflection occurs in other areas than the curved portion 5 of the beam portion 2. This is because the rigidity of the beam portion 2 is improved by the flanges 4 formed along the respective side edges of the beam portion 2. Accordingly, the mount 6 fixed to the rigid arm 31, the beam portion 2 and the gimbal 3 lying in the free-end region 2a can be arranged substantially in line with one another. In order to arrange the mount 6, the beam portion 2, the flanges 4 and the gimbal 3 of the magnetic head support mechanism 1 substantially in line with one another, the relative distance between the rigid arm 31 and the magnetic disk 33 may be adjusted. The pressing load at this time can be set at a proper value by adjusting parameters such as the width and length of the curved portion 5, the thickness of the thin film formed on the magnetic head support mechanism 1, the substrate thickness of the magnetic head support mechanism 1, and selection of a thin film material and a substrate material having proper Young's modules.

In the magnetic disk apparatus of this embodiment, a pressing load is generated by selective bending of the curved portion 5 of the magnetic head support mechanism 1. At this time, other portions than the curved portion 5 of the beam portion 2 do not deflect because of the flanges 4 on the beam portion 2, and the straightness of the beam portion 2 is maintained. As a result, in the magnetic disk apparatus of this embodiment, the surface of the beam portion 2 of the magnetic head support mechanism 1 is parallel to the surface of the magnetic disk 33, the in-plane rigidity and the in-plane characteristic frequency are higher than those of a conventional magnetic head support mechanism which is made of ceramic or stainless-steel and requires deflection, and the stability in seeking can be improved.

A method of manufacturing the magnetic head support mechanism 1 exemplified in Example 1 will be described below.

FIGS. 5A to 5G are explanatory views for sequentially showing respective steps in the method of manufacturing the magnetic head support mechanism of Embodiment 1 in which the beam portion 2 has the initial bent angle with respect to the mount 6.

Figure 5A:
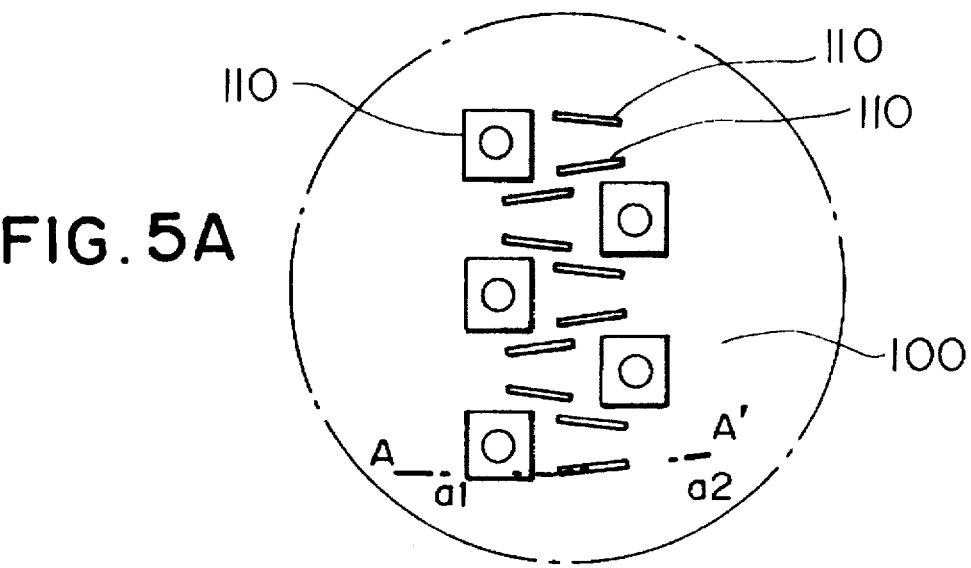
Figure 5B:
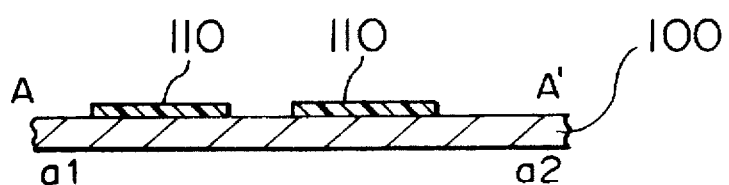

First, in order to form steps for the flanges 4 and the mount 6 on the beam portion 2 of the magnetic head support mechanism 1, resist layers 110 are formed in regions corresponding to the flanges 4 and the mount 6 on a monocrystalline silicon substrate 100 having a thickness of 25 μm, (see FIGS. 5A and 5B). Reference symbol a1 in FIGS. 5A and 5B denotes an end portion of a magnetic head support mechanism on the mount 6 side upon completion of the formation, and reference symbol a2 denotes an end portion or free-end region 2a of the mechanism on the gimbal 3 side.

Figure 5C:
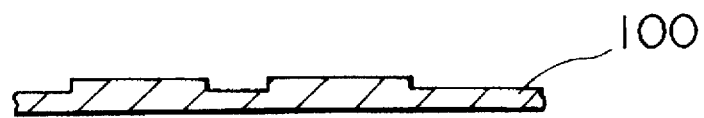

Thereafter, the beam portion 2 and the gimbal 3 are processed by etching to have a small thickness, and the resultant structure is dipped in a peeling liquid to remove the resist layers 110 (see FIG. 5C).

Figure 5D:
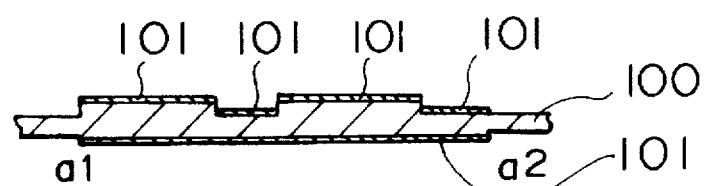

Subsequently, an $Si_3N_4$ film 101 having a thickness of 0.47 μm is formed by a low pressure chemical vapor deposition method or LPCVD on both surfaces of a portion of the monocrystalline silicon substrate 100 where the magnetic head support mechanism 1 is made (see FIG. 5D).

The details of the film formation condition are as follows. An $SiCl_2H_2$ gas and an $NH_3$ gas are supplied at 70 cc/sec. and 18 cc/sec., respectively, a pressure is 26.7 Pa, and a temperature is 850°. At this time, a film formation rate of 0.5 μm/min. is achieved.

Wires for read/write signals (not shown) are formed on the resultant structure by patterning.

Figure 5E:
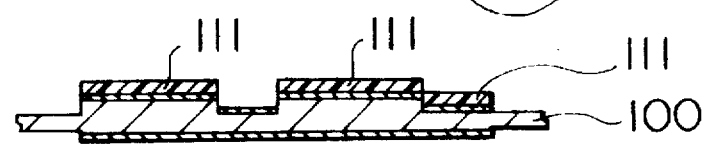
Figure 5F:
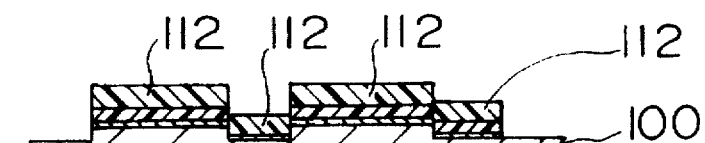

Thereafter, in order to remove the $Si_3N_4$ film deposited on the curved portion 5 where the initial bent angle is to be provided, a resist layer 111 is selectively formed on another region of the portion for forming the magnetic head support mechanism 1 than the curved portion 5 (see FIG. 5E).

Figure 5G:
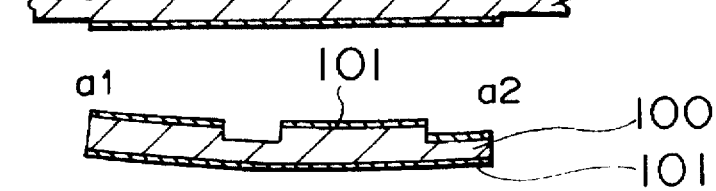

In the next step, in order to separate the magnetic head support mechanism 1 from the monocrystalline silicon substrate 100 and form the gimbal 3 of the magnetic head support mechanism 1, a further layer of resist 112 is formed on the portion where the magnetic head support mechanism 1 is formed (see FIG. 5F), and the resultant structure is etched and dipped in a peeling liquid to remove the resist layers 111 and 112 (see FIG. 5G).

Additionally describing a portion which does not appear in the figures, as a matter of course, no resist layer 112 is formed in gaps for defining the gimbal 3. The principle of forming an initial bend according to this method utilizes residual stress which is caused in monocrystalline silicon when the $Si_{3N4}$ film on the monocrystalline silicon substrate 100 is removed. Tensile stress remains near the surface of the monocrystalline silicon from which the $Si_3N_4$ film is removed. A bent angle is provided by applying this tensile stress to the surface of the magnetic head support mechanism 1 facing the magnetic disk.

The exposed surface of the monocrystalline silicon is naturally oxidized. However, the oxide offers no problem because its thickness is on the order of nanometer at most and not enough to cause deformation.

In order to increase the initial bent angle of the magnetic head support mechanism 1, etching is further performed, after the $Si_3N_4$ film has been removed from the curved portion 5, to cut a part of the monocrystalline silicon substrate 100. Thus, the initial bent angle can be increased.

As for a method of forming the $Si_3N_4$ film, in addition to LPCVD, plasma CVD, sputtering, or the like, may be used.

In this embodiment, although the tensile stress caused in the silicon when removing the $Si_3N_4$ film 101 on the monocrystalline silicon substrate 100 is used, another method may also be used. That is, an $SiO_2$ film is formed on a monocrystalline silicon substrate, and compression stress caused in the silicon when removing the $SiO_2$ film can be utilized. In this case, however, since the curving direction is reversed, the $SiO_2$ film is removed from the surface of the magnetic head support mechanism 1 opposite to its surface facing the magnetic disk.

The condition for forming the $SiO_2$ film on the monocrystalline silicon substrate 100 is as follows. A plasma CVD, i.e., PECVD (Plasma Enhanced Chemical Vapor Deposition), apparatus is used, an $SiH_4$ gas and an $N_2O$ gas are supplied at 200 cc/sec. and 710 cc/sec., respectively, and a pressure of 85 Pa, a temperature of 300° C., and an RF power of 60 W are used. In order to have a bent angle of 5° with this method, after an $SiO_2$ film having a thickness of 1.9 μm is formed on the monocrystalline silicon substrate 100 having a thickness of 25 μm, the $SiO_2$ film on the curved portion 5 is removed.

As a method of forming the $SiO_2$ film, LPCVD, sputtering, or the like, may be used.

With the use of the method of manufacturing the magnetic head support mechanism 1 according to the embodiment, the thickness of the $Si_3N_4$ film or the $SiO_2$ film can be easily controlled. Accordingly, it is possible to accurately control the bent angle of the curved portion 5 and thereby improve the precision of dimensions of the product. In addition, because of the improved precision of the product dimensions, a margin of control of processes such as thin film formation, etching, and the like, can be increased, and variations in bent angle of the curved portion 5 can be decreased in a substrate, between substrates, and in lots. As a result, the performance of the magnetic disk apparatus which is a final product is stabled, and its reliability can be advantageously improved.

In the method of manufacturing the magnetic head support mechanism 1 of the invention, a process for generating internal stress is performed before the magnetic head support mechanism 1 is cut from the substrate. For this reason, a remarkable effect can be obtained when a large number of magnetic head support mechanisms having uniform quality are produced in a batch manner.

The embodiment has been described to use a thin film for generating internal stress to form the curved portion 5. However, a region 72 for forming a curved portion in FIG. 10 may be selectively reformed and processed to generate internal stress.

(Embodiment 2)

FIGS. 6A to 6F are views for sequentially explaining the steps in another method according to Example 2 for manufacturing the magnetic head support mechanism in which the beam portion 2 has an initial bent angle with respect to the mount 6.

Figure 6A:
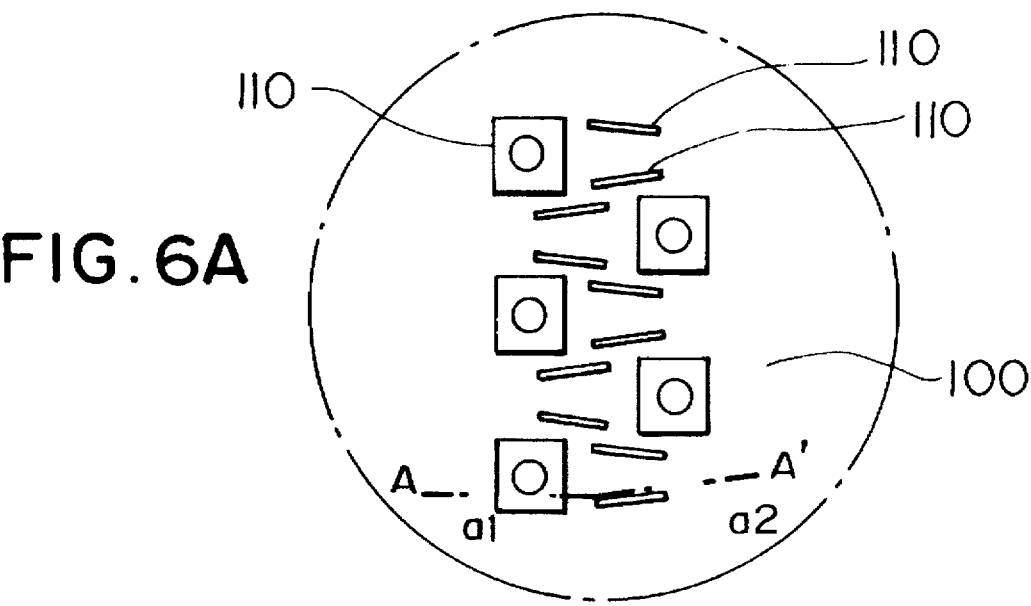
Figure 6B:
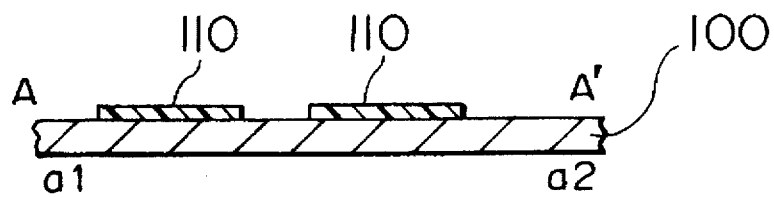
Figure 6C:
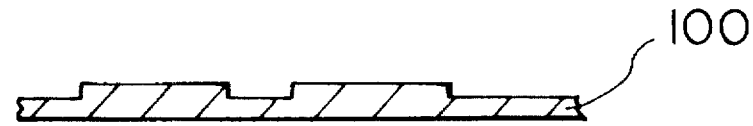

First, in order to form steps for the flanges 4 and the mount 6 of the magnetic head support mechanism 1, resist layers 110 are formed on portions of a monocrystalline silicon substrate 100 corresponding to the flanges 4 and the mount 6 (see FIGS. 6A and 6B), and the resultant structure is etched (FIG. 6C).

Figure 6D:
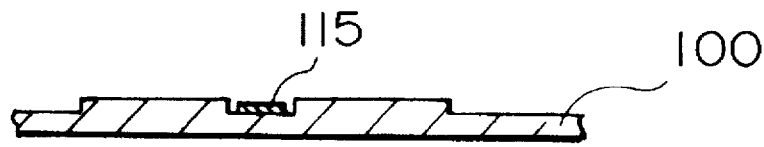
Figure 6E:
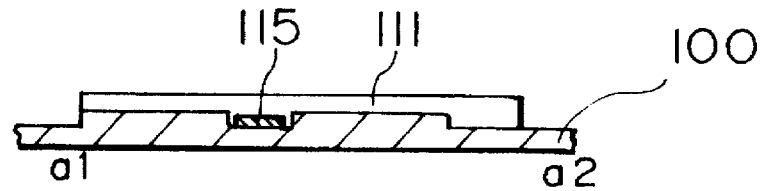

After the resultant structure is dipped in a peeling liquid to remove the resist layers 110 remaining on the beam portion 2, an Al film 115 is sputtered on the curved portion 5 in which an initial bent angle is to be provided (FIG. 6D).

Figure 6F:
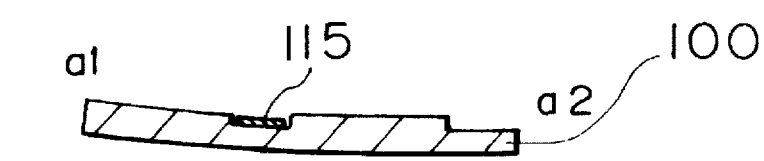

Finally, in order to separate the magnetic head support mechanism 1 from the monocrystalline silicon substrate 100 and form the gimbal 3 of the magnetic head support mechanism 1, a resist layer 111 is formed on the portion which constitutes the magnetic head support mechanism 1 (see FIG. 6E), and the resultant structure is etched and dipped in a peeling liquid to remove the resist layer 111 (see FIG. 6F).

The principle for forming an initial bend according to this embodiment also utilizes residual stress which is caused in monocrystalline silicon during the manufacturing process for the magnetic head support mechanism 1. When the Al film 115 is formed on the monocrystalline silicon substrate 100, tensile stress acts on a portion where the Al film 115 is formed on the monocrystalline silicon substrate 100.

In this embodiment, when the rear surface of the curved portion 5 on which the Al film 115 is formed is etched to cut a part of monocrystalline silicon, the initial bent angle of the curved portion 5 of the magnetic head support mechanism 1 can be increased. Alternatively, the rear surface of the curved portion 5 on which the Al film 115 is to be formed may be etched to remove a part of monocrystalline silicon in advance, and then the Al film 115 may be formed.

In this embodiment, although the Al film is formed by sputtering to provide an initial bent angle, a vapor deposition method may be used. Further, a Cr film or the like may be formed by vapor deposition in place of the Al film. A selective growing method for a metal film using laser CVD, ion beam CVD, or the like, may also be used.

Comparing the manufacturing method of Embodiment 2 with the manufacturing method of Embodiment 1 described above, the former is advantageous in that the initial bent angle can be increased. Moreover, since a metal film can be manufactured at a low cost as compared with a dielectric film, the metal film is advantageously competitive in cost.

Figure 7:
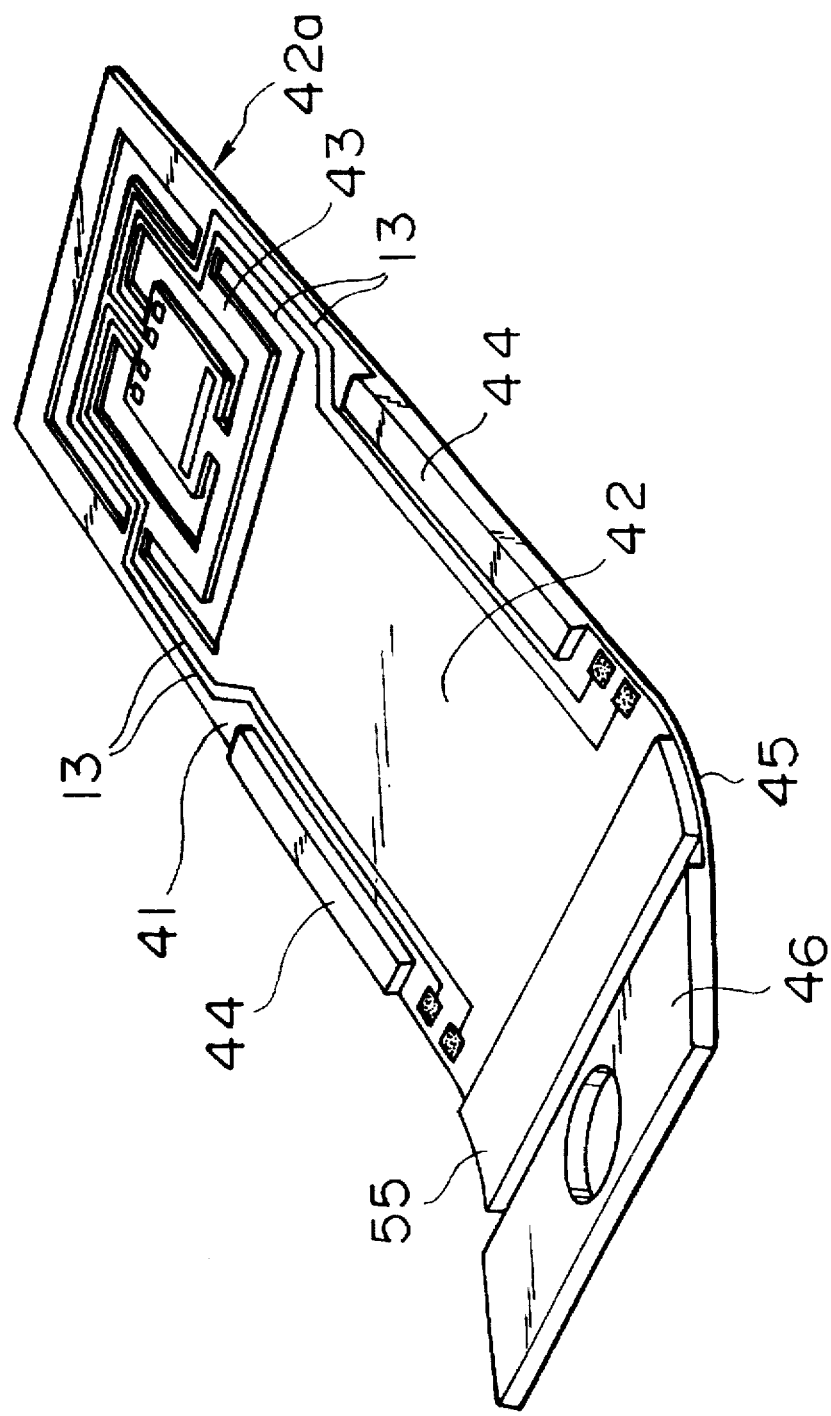
FIG. 7 is a perspective view showing a magnetic head support mechanism according to another embodiment of the invention.

FIG. 7 shows an example of a magnetic head support mechanism having an initial bent angle, which was manufactured by the method exemplified in Embodiment 2. The magnetic head support mechanism 41 comprises flanges 44, a gimbal 43, a beam portion 42 having a curved portion 45, and a mount 46. Wires 13 are formed on the beam portion 42. In this embodiment, an Al film 55 is selectively formed on the curved portion 45 which is provided near the mount 46. A magnetic head is to be supported by a free-end region 42a of the beam portion 42.

In the method of manufacturing the magnetic head support mechanism according to Embodiment 2, the Al film 55 of a metal film is used. Accordingly, in addition to an effect that the precision of product dimensions is improved, the following effects can be obtained. That is, the controllability of a bent angle can be improved because the thickness can be increased, and the production cost can be reduced because the cost for forming a metal thin film is generally low.

(Embodiment 3)

As embodiment 3, description will be made of a case wherein a magnetic head and a beam portion which is a part of a magnetic head support mechanism are integrally formed.

Figure 8:
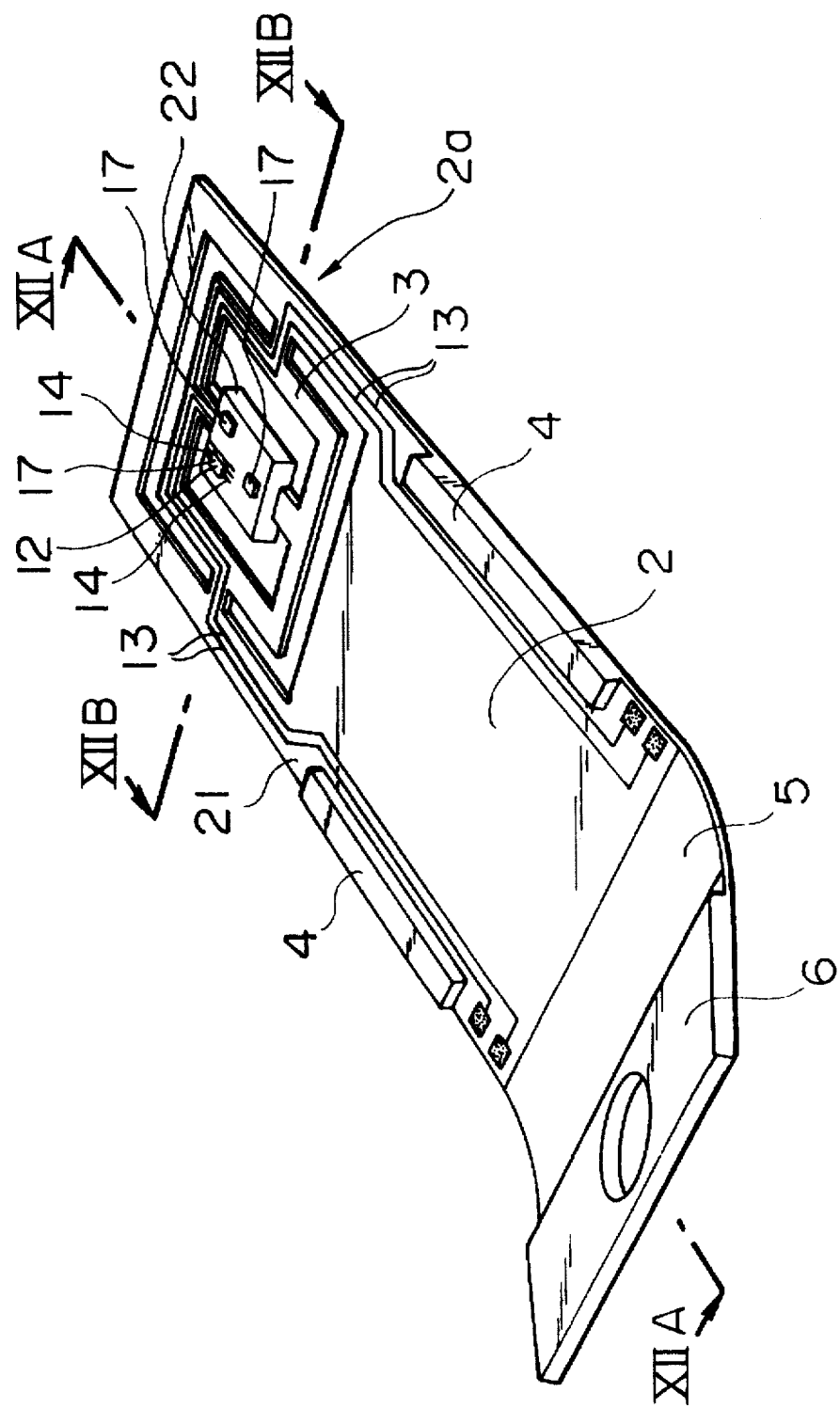
FIG. 8 is a perspective view showing a magnetic head support mechanism according to still another embodiment of the invention.

FIG. 8 shows a magnetic head support mechanism 21 of Embodiment 3 in which the beam portion 2 has an initial bent angle with respect to the mount 6. A magnetic head slider 22 and the beam portion 2 which is a part of the magnetic head support mechanism 21 having the initial bent angle are integrally formed with each other in a free-end region 2a of the beam portion 2.

When manufacturing the magnetic head support mechanism 21 of Embodiment 3, the magnetic head support mechanism 21 and the magnetic head slider 22 are manufactured through the application of a series of thin film formation techniques. In order to simplify the process, a magnetic head element 12 including coils 14 is formed by film formation on the surface of the magnetic head slider 22 facing a magnetic disk such that it coincides with the directions of sputtering and etching processes during fabrication of the magnetic head element 12.

The method of manufacturing the magnetic head support mechanism 21 of Embodiment 3 is the same as the method of Embodiment 1 until the wires 13 are patterned on the magnetic head support mechanism 1. Thereafter, the magnetic head slider 22 is formed by sputtering silicon. At this time, a metal film for transmission of signals is also formed to connect the magnetic head element 12 to the magnetic head support mechanism 21.

After sputtering is continued until the magnetic head slider 22 of a silicon material has a sufficient thickness, the magnetic head element 12 and an air bearing surface are formed on the surface of the magnetic head slider 22 facing the magnetic disk. In this embodiment, three fine projections 17 are formed each of which has a length of 20 μm, a width of 10 μm, and a height of 10 μm.

In the subsequent steps, as in Embodiment 1, the curved portion 5 is formed, the resist layers 111 and 112 for simultaneously performing formation of the gimbal 3 and cutting of the magnetic head support mechanism 21 are selectively formed with their thicknesses adjusted, and the resultant structure is etched.

In the magnetic head support mechanism 21 of Embodiment 3, as the magnetic head slider 22 and the magnetic head element 12 are integrally formed with the beam portion 2 serving as a support mechanism therefor, the slider portion need not be adhered to the support mechanism later, the precision of finished dimensions can be improved, and parts of stable performance can be produced.

By integrally forming the magnetic head slider 22 and the magnetic head element 12 on the surface facing the magnetic disk of the magnetic head support mechanism 21 in Embodiment 3, the magnetic head support mechanism 21 and the magnetic head are continuously manufactured through a series of sputtering techniques. Assembling of the magnetic head slider 22 and the magnetic head support mechanism 21 which causes variations in the magnetic head support mechanism 21 can be avoided. Accordingly, the steps which have to rely on skilled workers can be eliminated, and this enables automation of the process.

Further, by continuously producing the magnetic head support mechanism 21, the magnetic head slider 22 and the magnetic head element 12 including the coils 14, a reduction in the cost of parts, improvement on the production reliability, and an increase in yield can be achieved.

The magnetic head slider 22 and the magnetic head element 12 are made of an inorganic material using a thin film process, and therefore, a more noticeable effect can be obtained when using a substrate of a ceramics material, a monocrystalline silicon material, or an SOI material which is generally excellent in adhesion property and excellent affinity relative to an inorganic material.

In the method of manufacturing the magnetic head support mechanism 21, a crown or a camber, or both of them can be formed on the magnetic head slider 22.

FIGS. 12A and 12B are partially sectional views of the magnetic head support mechanism 21 in FIG. 8 taken along lines XIIa—XIIa and XIIb—XIIb line. Referring to FIG. 12A, the magnetic head slider 22 is integrally formed with the gimbal 3 which is connected to the mount 6 and lies in the free-end region 2a of the beam portion 2 including the curved portion 5 and the flanges 4. Before fabrication of the gimbal 3 and cutting of the magnetic head support mechanism 21, $Si_3N_4$ left on the rear surface of the magnetic head slider 22 is removed by etching, thereby forming a crown 22a in the magnetic head slider 22. Further, as shown in FIG. 12B, a camber 22b can be formed in the magnetic head slider 22 integrally formed with the gimbal 3, in the same manner as forming the crown 22a. Although the crown 22a and camber 22b are simultaneously formed in the embodiment described above, either the crown 22a or the camber 22b can be formed depending on the shape of etching of the $Si_3N_4$ film on the rear surface of the magnetic head slider. The crown 22a and camber 22b can also be formed by physically or chemically etching the substrate on the rear surface of the magnetic head slider 22.

With the provision of the crown 22a, the camber 22b or both of them in the magnetic head slider 22 as above, when the magnetic head slider 22 is brought into contact with the magnetic disk 33 upon stoppage of the operation of the magnetic disk apparatus, the possibility of adhesion of the magnetic head slider 22 to the magnetic disk 33 under the influence of a lubricant on the surface of the magnetic disk 33, atmospheric moisture and the like can be decreased. As a result, the reliability of the magnetic disk apparatus can be improved.

Although the magnetic head element 12 is formed in succession to the fabrication of the magnetic head slider 22 in this embodiment, the magnetic head element 12 may be separately made in advance. In this case, the magnetic head element is mounted after the magnetic head slider 22 has been integrally formed with the magnetic head support mechanism 21.

Further, although the embodiment employs the thin film forming method by sputtering as a method of forming the magnetic head slider 22, a thin film forming method using CVD or the like may be used as a matter of course.

(Embodiment 4)

Description will be made of another case wherein a magnetic head slider is integrally formed with a beam portion which is a part of a magnetic head support mechanism.

Figure 9:
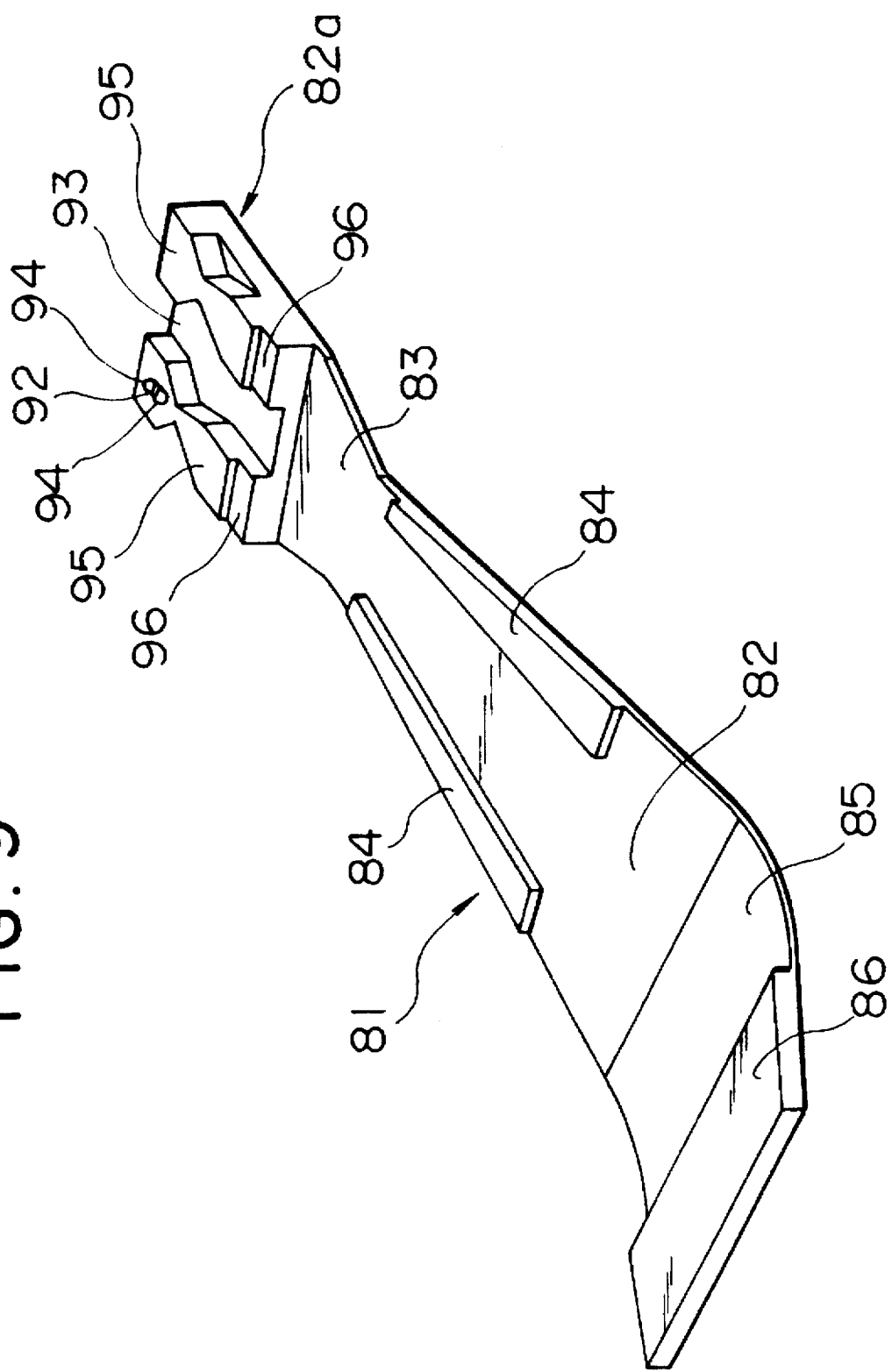
FIG. 9 is a perspective view showing a magnetic head support mechanism according to still another embodiment of the invention.

FIG. 9 is a perspective view showing the magnetic head support mechanism 81 in which the beam portion 82 has an initial bent angle with respect to a mount 86.

The magnetic head support mechanism 81 of Embodiment 4 comprises a curved portion 85, the beam portion 82 including flanges 84 and a gimbal 83, the mount 86, and a magnetic head slider 93. The magnetic head slider 93 is integrated at its free-end region 82a with the beam portion 82. The magnetic head slider 93 comprises a flow-in end 96 and a floating force generation surface 95, and a magnetic head element 92 including coils 94 is supported thereon. Embodiment 4 is different from Embodiment 3 in that the magnetic head slider 93 is formed of a monocrystalline silicon substrate by etching whereas the slider of the latter is formed through deposition of a thin film by sputtering. The essence of a method of manufacturing the magnetic head support mechanism 81 in Embodiment 4 will be described below.

First, a through hole for passing read/write signal wires is formed in a monocrystalline silicon substrate, a thin film head comprising the magnetic head element 92 and the coils 94 is formed by a series of sputtering and etching processes, and thereafter the shape of a surface of the magnetic head slider 93 facing a magnetic disk, which is constituted by the flow-in end 96 and the floating force generation surface 95, is formed by etching. After that, similarly to the magnetic head support mechanism of FIG. 7, a plate portion having the flanges 84 and the beam portion 82 as main portions is formed by etching.

Read/write wires are then formed on the magnetic head support mechanism 81 by patterning. In this case, the wires are provided on the rear surface of the magnetic head support mechanism 81, and they are connected to the magnetic head element 92 through the through hole formed as above. Predetermined thin film formation and etching processes for forming the curved portion 85 of the magnetic head support mechanism 81 are performed, and the resultant structure is finally etched while the thicknesses of resist layers are adjusted such that fabrication of the gimbal 83 and cutting of the magnetic head support mechanism 81 are simultaneously performed, thus manufacturing the magnetic head support mechanism 81.

In the magnetic head support mechanism 81 of Embodiment 4, the magnetic head slider 93 is formed not by the thin film forming method described in Embodiment 3, but by an etching method which is a wet process. Accordingly, in addition to the effect of Embodiment 3, the embodiment enables a batch process for simultaneously processing a large number of substrates. Therefore, the processing rate and throughput can be increased, and mass productivity is excellent. Further, as the manufacturing accuracy of the magnetic head support mechanism 81 can be improved, and as the quality control can be easily performed, a large number of parts which are uniform and of good quality can be advantageously manufactured.

(Embodiment 5)

Each of Embodiments 1 to 4 has been described as performing the process for generating internal stress in a predetermined region before the magnetic head support mechanism is cut from the substrate. However, description will now be made on a case wherein a process for generating internal stress in a predetermined region is performed after a magnetic head support mechanism is cut from a substrate.

Figure 10:
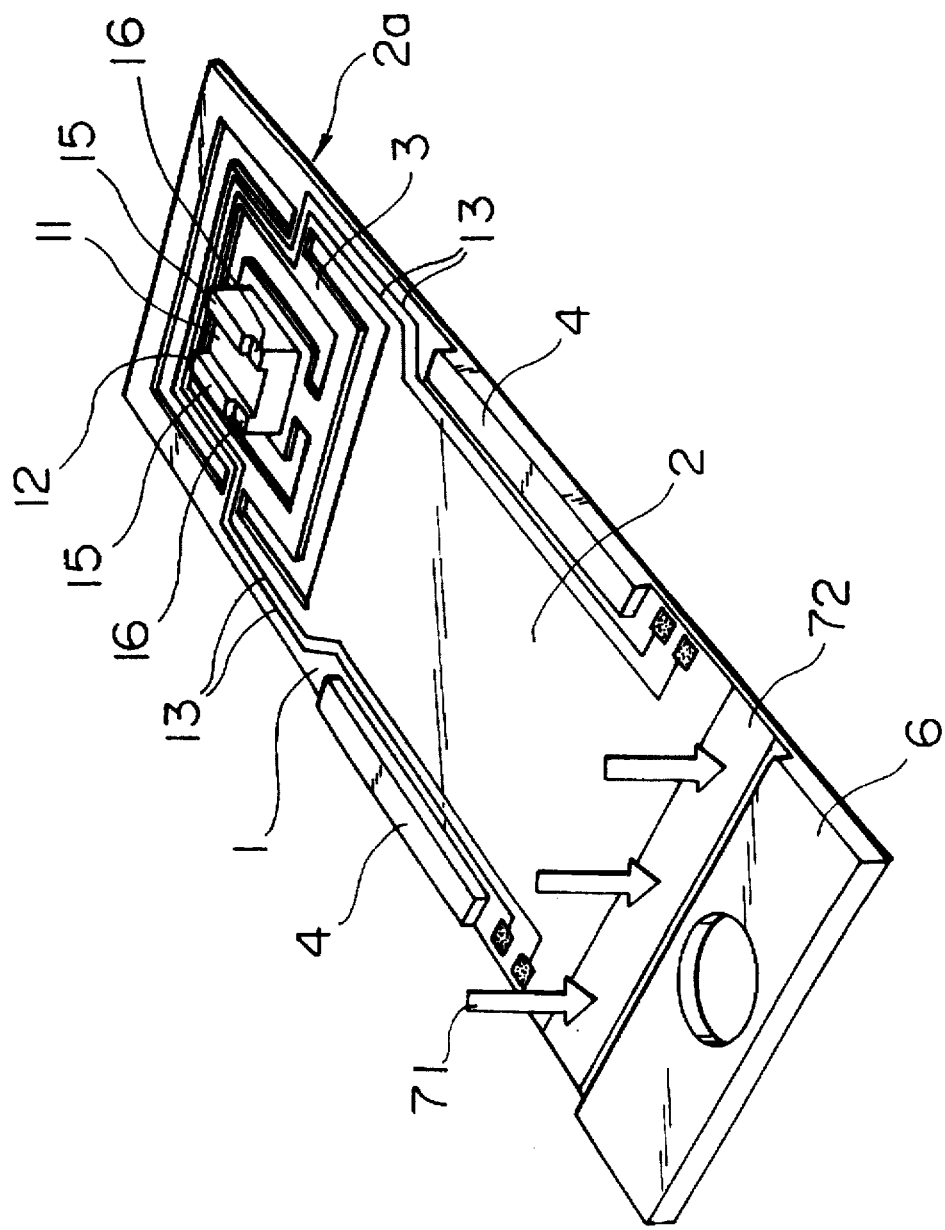
FIG. 10 is a perspective view showing the magnetic head support mechanism according to the invention before internal stress is generated.

FIG. 10 shows the magnetic head support mechanism according to Embodiment 5, which is manufactured by using the steps of the manufacturing method described in Embodiment 1 except for the step of forming a thin film. Because no thin film is formed, the magnetic head support mechanism has no internal stress generated and no curved portion when it is cut from the substrate.

Figure 11:
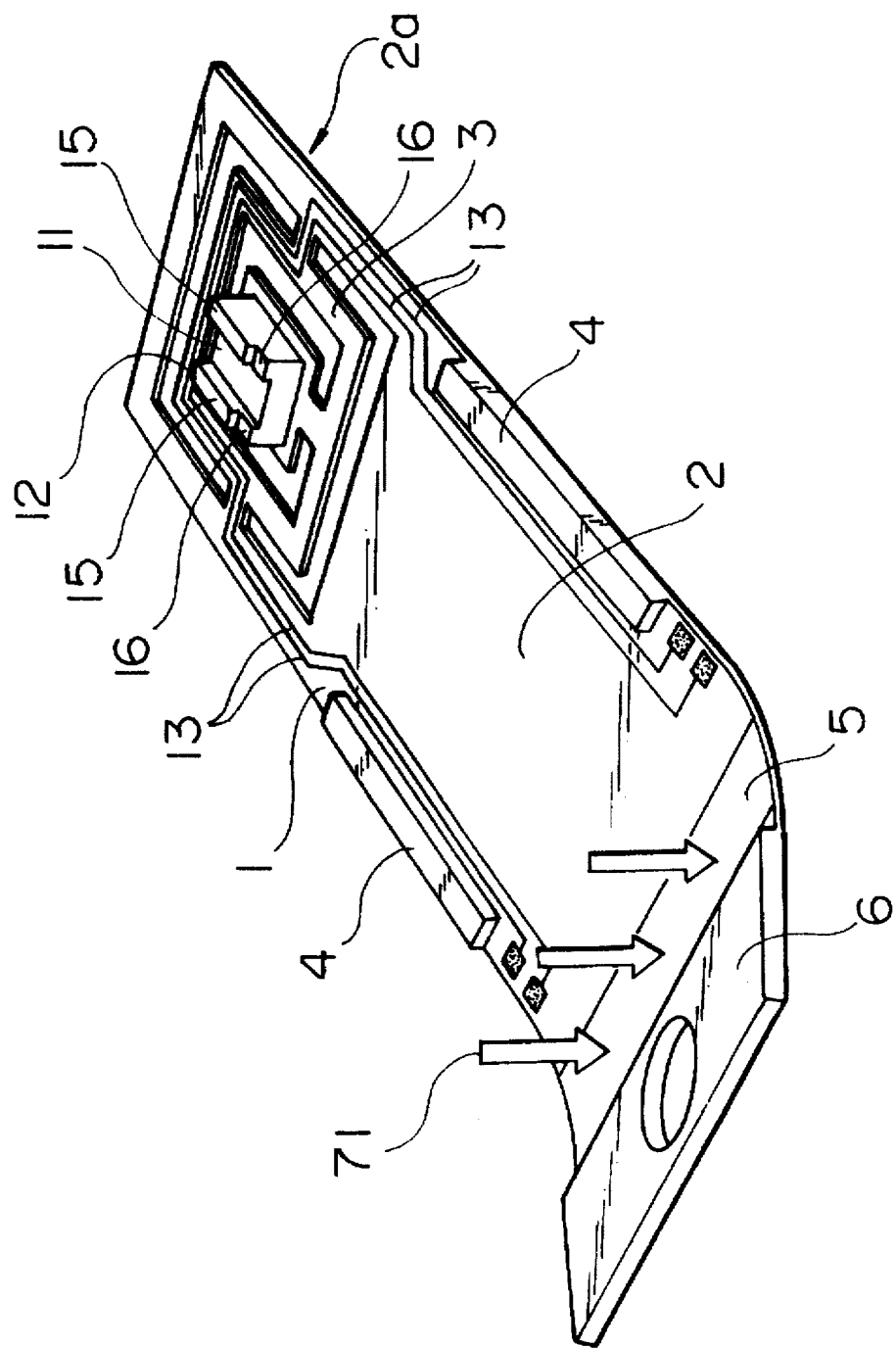
FIG. 11 is a perspective view showing the magnetic head support mechanism according to the invention after the internal stress has been generated.

In this state, an energy beam 71 is irradiated to a region 72 for a curved portion to generate internal stress in the irradiated surface, and, as shown in FIG. 11, the curved portion 5 of a desired angle is formed.

As the energy beam 71, for example, an ArF excimer laser beam having a wavelength of 193.2 nm can be used. In irradiation of the ArF excimer laser beam, when the atmosphere is filled with a hydrogen gas, the hydrogen gas is excited by the laser beam. Oxygen is removed from the substrate surface by the reduction effect of excited hydrogen, and internal stress can be more effectively generated. In the case where the reduction effect of hydrogen is weak, an additional plasma chamber or the like may be provided for preliminarily exciting and then supplying the gas.

The energy beam 71 is not limited to the ArF excimer laser beam, and it may be another excimer laser beam such as a KrF excimer laser or an XeCl excimer laser. Further, a laser beam such as an Ar ion laser beam or a YAG beam except for the excimer laser beam may be used as a matter of course.

Moreover, an electron beam, an ion beam, or the like other than a laser beam may be used. However, a laser beam is advantageous because it does not require a high-vacuum state and is easily focused.

Another method is effective as well. That is, the support mechanism other than the region 72 for forming the curved portion is masked with a resist film, and a gas such as a hydrogen gas having a reduction effect is irradiated as the energy beam 71 to the region.

Further, an ion beam may be used as the energy beam 71, and the ions may be injected in the substrate to generate internal stress. In this case, tensile stress is generated when an ablation effect by the irradiation of the energy beam is strong, and compression stress is caused when an interlocation effect by the ion injection is strong. For this reason, there is a case where it is necessary for an ion beam to be irradiated in a direction opposite to the irradiating direction in this embodiment.

After an element is cut from the substrate, some idea is effective for performing the above various processes. For instance, a tape or the like is adhered to the rear surface of the substrate to make it easy to handle the element cut from the substrate.

In the method of manufacturing the magnetic head support mechanism 1 of Embodiment 5, since respective magnetic head support mechanisms 1 are subject to the process for generating internal stress, such as irradiation of the energy beam 71, after they have been cut from the substrate, the curvature values of respective curved portions 5 can be different from one another. Further, the curvature values can be accurately controlled or managed. This can be realized such that the energy of an irradiation energy beam is controlled to provide a predetermined curvature value while the curvature value is observed by a proper monitor. As a method of monitoring the curvature value, a method of recognizing image data which is taken in a computer by an optical lever using a laser, a CCD, or the like, is available.

As for the method of generating internal stress in the curved portion by reforming with the various types of energy beams 71, Embodiment 5 exemplifies the case wherein the magnetic head support mechanism is processed after having been cut from the substrate. However, it is a matter of course that the process for generating internal stress may be performed before the magnetic head support mechanism is cut from the substrate, and then it may be cut from the substrate.

Incidentally, although the magnetic head support mechanism is made of a monocrystalline silicon substrate in each of Embodiments 1 to 5, it may be made of a ceramics substrate such as an $Al_2O_3$—Tic film or an $Al_2O_3$ film. Further, the magnetic head support mechanism may also be made of an SOI substrate using an $Al_2O_3$ film, an $SiO_2$ film, or the like, as an insulating layer.

When the SOI substrate is used, other than the methods described above in which a thin film is formed on the entire surface of the substrate and selectively etched or a metal film is selectively formed on the substrate to generate internal stress, it is also possible to selectively etch a silicon film on the surface of the SOI substrate to generate internal stress. In this case, another thin film need not be formed, and the process can be simplified.

In the case where the substrate of a magnetic head support mechanism is made of a silicon, ceramic, or SOI substrate, when the magnetic head slider 22 and the magnetic head element 12 are integrally formed with each other by a thin film process as described in Embodiments 3 and 4, as these thin films are of an inorganic material, these thin films have excellent adhesion properties and excellent affinity with respect to the substrate of the inorganic material. Further, the silicon, ceramic, or SOI substrate of an inorganic material is chemically and physically stable and is advantageous in that it can be stably used when performing a liquid-phase etching method and a thin film forming method which are employed in the manufacturing method of the embodiment. Etchants suitable for the substrate are advantageously present.

The invention attained by the present inventors has been described on the basis of the embodiments. The invention is not limited to the above embodiments, and various changes and modifications can be effected without departing from the scope or spirit of the invention.

For example, although in each of Embodiments 1 to 5, the curved portion is formed in a region near the mount 6 of the beam portion 2, the curved portion may be formed in another region of the magnetic head support mechanism 1, e.g., the central portion of the beam portion 2, an area near the gimbal 3 of the beam portion 2, or the gimbal 3.

What is claimed is:

1. A magnetic head support mechanism comprising:
   a. a beam portion
   b. a mount integrally formed on said portion for fixing said beam portion to an actuator, c. said beam portion having a free end d. a magnetic head supported on a free end side of said beam portion, e. said beam portion and said mount being made of a material selected from among a ceramic material, a monocrystalline silicon material, and a silicon-on-insulator material, and f. a thin film formed on one of a selected portion of said beam portion and a region adjacent said selected portion, such that said selected portion is an area of internal stress forming a curved portion in said beam portion by spontaneous deformation.

2. A magnetic head support mechanism according to claim 1, wherein said thin film is formed of one of silicon nitride and silicon oxide.

3. A magnetic head support mechanism according to claim 2, wherein said magnetic head on the free-end side of said beam portion comprises at least a magnetic head element and a magnetic head slider, and said magnetic head slider is integrally formed on said beam portion.

4. A magnetic head support mechanism according to claim 3, wherein said magnetic head slider has a crown or a camber formed by spontaneous deformation which is caused by internal stress.

5. A method of manufacturing a magnetic head support mechanism comprising a beam portion and a mount integrally formed on the beam portion for fixing the beam portion to an actuator, the beam portion having a free end and a magnetic head supported on a free end side of the beam portion, the beam portion and the mount being made of a material selected from among a ceramic material, a monocrystalline silicon material, and a silicon-on-insulator material, said method comprising a series of wafer processes including at least:

a first step of forming a region in which internal stress is generated by selectively depositing a thin film of one of silicon nitride and silicon oxide on at least a part of a region forming the beam portion of a substrate; and a second step of cutting the beam portion and the mount in one united body from the substrate.

6. A magnetic disk apparatus comprising:

a. a magnetic disk;

b. a mechanism for rotating the magnetic disk;

c. a magnetic head for recording information on and reproducing information from said magnetic disk;

d. magnetic head support mechanism having:

i. a beam portion ii. a mount for fixing said beam portion, iii. said beam portion having a free end and supporting said magnetic head on a free end side of said beam portion;

iv. said beam portion and said mount being made of a material selected among a ceramics material, a monocrystalline silicon material and a silicon-on-insulator material; and v. a thin film formed on one of a selected portion of said beam portion and a region adjacent said selected portion, such that said selected portion is an area of internal stress forming a curved portion by spontaneous deformation in said magnetic head support mechanism in a free state in which said mechanism is free from external force, said curved portion being selectively deformed such that a bent angle thereof is decreased when said magnetic head support mechanism is mounted on said magnetic disk apparatus, thereby generating a load for pressing said magnetic head to a surface of said magnetic disk; and e. an actuator for positioning said magnetic head with respect to said magnetic disk, said actuator having a rigid arm supported thereon, said mount being fixed to said rigid arm.

7. A magnetic disk apparatus according to claim 6, wherein said beam portion constituting said magnetic head support mechanism is substantially parallel to the surface of said magnetic disk.

8. A magnetic head support mechanism comprising a beam portion and a mount integrally formed on said beam portion for fixing said beam portion to an actuator, said beam portion having a free end and a magnetic head supported on a free end side of said beam portion, wherein said beam portion and said mount are made of a material selected from among a ceramic material, a monocrystalline silicon material, and a silicon-on-insulator material, and said beam portion has on at least a part thereof a curved portion formed by spontaneous deformation due to internal stress which is caused by selectively depositing a thin film in one of a region forming said curved portion and a region adjacent thereto and then removing a part of all of the thin film deposited.

9. A magnetic head support mechanism according to claim 8, wherein said thin film is formed of one of silicon nitride and silicon oxide.

10. A magnetic head support mechanism according to claim 9, wherein said magnetic head on the free-end side of said beam portion comprises at least a magnetic head element and a magnetic head slider, and said magnetic head slider is integrally formed on said beam portion.

11. A magnetic head support mechanism according to claim 10, wherein said magnetic head slider has a crown or a camber formed by spontaneous deformation which is caused by internal stress.

12. A method of manufacturing a magnetic head support mechanism comprising a beam portion and a mount integrally formed on the beam portion for fixing the beam portion to an actuator, the beam portion having a free end and a magnetic head supported on a free end side of the beam portion, the beam portion and the mount being made of a material selected from among a ceramic material, a monocrystalline silicon material, and a silicon-on-insulator material, said method comprising a series of wafer processes including at least:

a first step of forming a region in which internal stress is generated by selectively depositing a thin film of one of silicon nitride and silicon oxide on at least a part of a region forming the beam portion of a substrate and then removing a part or all of the thin film deposited; and a second step of cutting the beam portion and the mount in one united body from the substrate.

13. A magnetic disk apparatus comprising: a magnetic disk; a mechanism for rotating said magnetic disk; a magnetic head for recording information on and reproducing information form said magnetic disk; a magnetic head support mechanism having a beam portion and a mount for fixing said beam portion, said beam portion having a free end and supporting said magnetic head on a free end side of said beam portion; and an actuator for positiong said magnetic head with respect to said magnetic disk, said actuator having a rigid arm supported thereon, said mount being fixed to said rigid arm, wherein said magnetic head support mechanism has a curved portion in a free state in which said mechanism is free from external force, said curved portion is selectively deformed such that a bent angle thereof is decreased when said magnetic head support mechanism is mounted on said magnetic disk apparatus, thereby causing a load on said magnetic head for pressing said magnetic head to a surface of said magnetic disk, said beam portion and said mount are made of a material selected from among a ceramic material, a monocrystalline silicon material, and a silicon-on-insulator material, and said curved portion is formed by spontaneous deformation due to internal stress which is caused in said curved portion by selectively depositing a thin film of one of silicon nitride and silicon oxide in one of a region forming said curved portion and a region adjacent thereto and then removing a part or all of the thin film deposited.

14. A magnetic disk apparatus according to claim 13, wherein said beam portion constituting said magnetic head support mechanism is substantially parallel to the surface of said magnetic disk.

15. A magnetic head support mechanism comprising a beam portion and a mount integrally formed on said beam portion for fixing said beam portion to an actuator, said beam portion having a free end and a magnetic head supported on a free end side of said beam portion, wherein said beam portion and said mount are made of a material selected from among a ceramic material, a monocrystalline silicon material, and a silicon-on-insulator material, and said beam portion has on at least a part thereof a curved portion formed by spontaneous deformation due to internal stress which is caused by selectively depositing a thin film in one of a region forming said curved portion and a region adjacent thereto.

16. A magnetic head support mechanism according to claim 15, wherein said thin film is formed of one of silicon nitride and silicon oxide.

17. A magnetic head support mechanism according to claim 16, wherein said magnetic head on the free-end side of said beam portion comprises at least a magnetic head element and a magnetic head slider, and said magnetic head slider is integrally formed on said beam portion.

18. A magnetic head support mechanism according to claim 17, wherein said magnetic head slider has a crown or a camber formed by spontaneous deformation which is caused by internal stress.

19. A magnetic disk apparatus comprising: a magnetic disk; a mechanism for rotating said magnetic disk; a magnetic head for recording information on and reproducing information form said magnetic disk; a magnetic head support mechanism having a beam portion and a mount for fixing said beam portion, said beam portion having a free end and supporting said magnetic head on a free end side of said beam portion; and an actuator for positiong said magnetic head with respect to said magnetic disk, said actuator having a rigid arm supported thereon, said mount being fixed to said rigid arm, wherein said magnetic head support mechanism has a curved portion in a free state in which said mechanism is free from external force, said curved portion is selectively deformed such that a bent angle thereof is decreased when said magnetic head support mechanism is mounted on said magnetic disk apparatus, thereby causing a load on said magnetic head for pressing said magnetic head to a surface of said magnetic disk, said beam portion and said mount are made of a material selected from among a ceramic material, a monocrystalline silicon material, and a silicon-on-insulator material, and said curved portion is formed by spontaneous deformation due to internal stress which is caused in said curved portion by selectively depositing a thin film of one of silicon nitride and silicon oxide in one of a region forming said curved portion and a region adjacent thereto.

20. A magnetic disk apparatus according to claim 19, wherein said beam portion constituting said magnetic head support mechanism is substantially parallel to the surface of said magnetic disk.

* * * * *

UNITED STATES PATENT AND TRADEMARK OFFICE
CERTIFICATE OF CORRECTION

PATENT NO. : 5,724,211
DATED : March 3, 1998
INVENTOR(S) : Teruyoshi HIGASHIYA, et al.

It is certified that error appears in the above-identified patent and that said Letters Patent is hereby corrected as shown below:

Column 1, line 21, change "stainless-steel" to --stainless steel--.

Column 1, line 59, change "exclusive" to --exclusively--.

Column 3, line 12, after "invention" insert --is--.

Column 6, line 66, change "describe" to --described--.

Column 7, line 44, change "stain-less" to --stainless--.

Column 8, line 19, delete "that".

Column 8, line 32, after "frequency" insert --of--.

Column 8, line 58, delete "line".

Column 9, line 8, delete "line".

Column 9, line 11, delete "line".

Column 9, line 49, delete "magnetic head".

Column 12, line 4, after "850°", insert --C.--.

UNITED STATES PATENT AND TRADEMARK OFFICE
CERTIFICATE OF CORRECTION

PATENT NO. : 5,724,211
DATED : March 3, 1998
INVENTOR(S) : Teruyoshi HIGASHIYA, et al.

It is certified that error appears in the above-indentified patent and that said Letters Patent is hereby corrected as shown below:

Column 12, line 27, change "$Si_{3N4}$" to --$Si_3N_4$--.

Column 13, line 13, change "stabled," to --stabilized,--.

Column 15, line 35, after "and" insert --has--.

Column 15, line 43, delete "line".

Column 20, line 55, change "form" to --from--.

Column 20, line 59, change "positiong" to --positioning--.

Column 22, line 8, change "form" to --from--.

Signed and Sealed this

Twenty-second Day of December, 1998

Attest:

BRUCE LEHMAN

Attesting Officer

Commissioner of Patents and Trademarks